(12) United States Patent
Henson et al.

(10) Patent No.: US 12,089,546 B2
(45) Date of Patent: Sep. 17, 2024

(54) METHOD AND SYSTEM FOR DYNAMIC POWER DELIVERY TO A FLEXIBLE GROWCENTER USING UNUTILIZED ENERGY SOURCES

(71) Applicant: LANCIUM LLC, Houston, TX (US)

(72) Inventors: David Henson, Houston, TX (US); Michael T. McNamara, Houston, TX (US); Raymond E. Cline, Jr., Houston, TX (US)

(73) Assignee: LANCIUM LLC, Houston, TX (US)

( * ) Notice: Subject to any disclaimer, the term of this patent is extended or adjusted under 35 U.S.C. 154(b) by 0 days.

(21) Appl. No.: 18/143,277

(22) Filed: May 4, 2023

(65) Prior Publication Data

US 2023/0284570 A1 Sep. 14, 2023

Related U.S. Application Data

(63) Continuation of application No. 16/961,386, filed as application No. PCT/US2018/017955 on Feb. 13, 2018, now Pat. No. 11,678,615.
(Continued)

(51) Int. Cl.
*H02J 13/00* (2006.01)
*A01G 9/18* (2006.01)
(Continued)

(52) U.S. Cl.
CPC ............... *A01G 9/243* (2013.01); *A01G 9/18* (2013.01); *A01G 9/24* (2013.01); *A01G 9/246* (2013.01);
(Continued)

(58) Field of Classification Search
CPC ............ H02J 13/00; H02J 3/381; A01G 9/243
See application file for complete search history.

(56) References Cited

U.S. PATENT DOCUMENTS

| 4,106,097 A | 8/1978 | Fox et al. |
| 4,245,319 A | 1/1981 | Hedges |

(Continued)

FOREIGN PATENT DOCUMENTS

| CN | 1847626 A | 10/2006 |
| CN | 101803148 A | 8/2010 |

(Continued)

OTHER PUBLICATIONS

Abhyankar et al., "Using PETSc to Develop Scalable Applications for Next-Generation Power Grid," High Performance Computing, Networking and Analytics for the Power Grid, Nov. 2011 pp. 67-74 https://doi.org/10.1145/2096123.2096138.
(Continued)

*Primary Examiner* — Sisay G Tiku
(74) *Attorney, Agent, or Firm* — Barnes & Thornburg LLP

(57) ABSTRACT

A flexible growcenter includes a mobile container, a behind-the-meter power input system, a power distribution system, a growcenter control system, a climate control system, a lighting system, and an irrigation system. The growcenter control system modulates power delivery to one or more components of the climate control system, the lighting system, and the irrigation system based on unutilized behind-the-meter power availability or an operational directive. A method of dynamic power delivery to a flexible growcenter using unutilized behind-the-meter power includes monitoring unutilized behind-the-meter power availability, determining when a growcenter ramp-up condition is met, and enabling behind-the-meter power delivery to one or more computing systems when the growcenter ramp-up condition is met.

18 Claims, 8 Drawing Sheets

Related U.S. Application Data

(60) Provisional application No. 62/616,348, filed on Jan. 11, 2018.

(51) Int. Cl.

| | | |
|---|---|---|
| *A01G 9/24* | (2006.01) | |
| *A01G 9/26* | (2006.01) | |
| *G05B 19/042* | (2006.01) | |
| *G06F 1/3203* | (2019.01) | |
| *G06F 9/48* | (2006.01) | |
| *H02J 3/38* | (2006.01) | |
| *H02S 40/32* | (2014.01) | |

(52) U.S. Cl.
CPC ............ *A01G 9/247* (2013.01); *A01G 9/249* (2019.05); *A01G 9/26* (2013.01); *G05B 19/042* (2013.01); *G06F 1/3203* (2013.01); *G06F 9/4856* (2013.01); *H02J 3/38* (2013.01); *H02J 3/381* (2013.01); *H02J 13/00* (2013.01); *H02J 13/00002* (2020.01); *H02J 13/00007* (2020.01); *H02S 40/32* (2014.12); *G05B 2219/2639* (2013.01); *H02J 2300/20* (2020.01); *H02J 2300/24* (2020.01); *H02J 2300/28* (2020.01)

(56) References Cited

U.S. PATENT DOCUMENTS

| | | |
|---|---|---|
| 4,247,786 A | 1/1981 | Hedges |
| 4,371,779 A | 2/1983 | Maynard et al. |
| 4,551,812 A | 11/1985 | Gurr et al. |
| 5,142,672 A | 8/1992 | Johnson et al. |
| 5,367,669 A | 11/1994 | Holland et al. |
| 5,544,046 A | 8/1996 | Niwa |
| 5,761,083 A | 6/1998 | Brown, Jr. et al. |
| 5,913,046 A | 6/1999 | Barth et al. |
| 6,115,698 A | 9/2000 | Tuck et al. |
| 6,244,516 B1 | 6/2001 | Langervik et al. |
| 6,288,456 B1 | 9/2001 | Cratty |
| 6,437,692 B1 | 8/2002 | Petite et al. |
| 6,473,744 B1 | 10/2002 | Tuck et al. |
| 6,519,509 B1 | 2/2003 | Nierlich et al. |
| 6,618,709 B1 | 9/2003 | Sneeringer |
| 6,633,823 B2 | 10/2003 | Bartone et al. |
| 6,643,567 B2 | 11/2003 | Kolk et al. |
| 6,681,154 B2 | 1/2004 | Nierlich et al. |
| 6,745,105 B1 | 6/2004 | Fairlie et al. |
| 6,748,932 B1 | 6/2004 | Sorter et al. |
| 6,772,031 B1 | 8/2004 | Strand |
| 6,775,595 B1 | 8/2004 | Yabutani et al. |
| 6,785,592 B1 | 8/2004 | Smith et al. |
| 6,868,293 B1 | 3/2005 | Schurr et al. |
| 6,912,450 B2 | 6/2005 | Fairlie et al. |
| 7,010,363 B2 | 3/2006 | Donnelly et al. |
| 7,027,992 B2 | 4/2006 | Zaccaria et al. |
| 7,035,179 B2 | 4/2006 | Chen et al. |
| 7,053,767 B2 | 5/2006 | Petite et al. |
| 7,054,271 B2 | 5/2006 | Brownrigg et al. |
| 7,062,360 B2 | 6/2006 | Fairlie et al. |
| 7,076,339 B2 | 7/2006 | Yabutani et al. |
| 7,088,014 B2 | 8/2006 | Nierlich et al. |
| 7,127,328 B2 | 10/2006 | Ransom |
| 7,130,832 B2 | 10/2006 | Bannai et al. |
| 7,135,956 B2 | 11/2006 | Bartone et al. |
| 7,143,300 B2 | 11/2006 | Potter et al. |
| 7,149,605 B2 | 12/2006 | Chassin et al. |
| 7,181,316 B2 | 2/2007 | Fairlie et al. |
| 7,188,003 B2 | 3/2007 | Ransom et al. |
| 7,206,670 B2 | 4/2007 | Pimputkar et al. |
| 7,278,273 B1 | 10/2007 | Whitted et al. |
| 7,305,282 B2 | 12/2007 | Chen |
| 7,333,880 B2 | 2/2008 | Brewster et al. |
| 7,369,968 B2 | 5/2008 | Johnson et al. |
| 7,376,851 B2 | 5/2008 | Kim |
| 7,420,293 B2 | 9/2008 | Donnelly et al. |
| 7,460,930 B1 | 12/2008 | Howell et al. |
| 7,468,661 B2 | 12/2008 | Petite et al. |
| 7,519,453 B2 | 4/2009 | Fairlie et al. |
| 7,561,977 B2 | 7/2009 | Horst et al. |
| 7,565,224 B2 | 7/2009 | Fairlie et al. |
| 7,647,516 B2 | 1/2010 | Ranganathan et al. |
| 7,702,931 B2 | 4/2010 | Goodrum et al. |
| 7,779,276 B2 | 8/2010 | Bolan et al. |
| 7,783,907 B2 | 8/2010 | Dubinsky |
| 7,861,102 B1 | 12/2010 | Ranganathan et al. |
| 7,921,315 B2 | 4/2011 | Langgood et al. |
| 7,970,561 B2 | 6/2011 | Pfeiffer |
| 8,001,403 B2 | 8/2011 | Hamilton et al. |
| 8,006,108 B2 | 8/2011 | Brey et al. |
| 8,214,843 B2 | 7/2012 | Boss et al. |
| 8,260,913 B2 | 9/2012 | Knapp et al. |
| 8,327,123 B2 | 12/2012 | Juffa et al. |
| 8,374,928 B2 | 2/2013 | Gopisetty et al. |
| 8,447,993 B2 | 5/2013 | Greene et al. |
| 8,571,820 B2 | 10/2013 | Pfeiffer |
| 8,595,094 B1 | 11/2013 | Forbes, Jr. |
| 8,595,515 B1 | 11/2013 | Weber et al. |
| 8,601,287 B1 | 12/2013 | Weber et al. |
| 8,627,123 B2 | 1/2014 | Jain et al. |
| 8,639,392 B2 | 1/2014 | Chassin |
| 8,700,929 B1 | 4/2014 | Weber et al. |
| 8,706,914 B2 | 4/2014 | Duchesneau |
| 8,706,915 B2 | 4/2014 | Duchesneau |
| 8,719,223 B2 | 5/2014 | Knapp et al. |
| 8,789,061 B2 | 7/2014 | Pavel et al. |
| 8,799,690 B2 | 8/2014 | Dawson et al. |
| 8,839,551 B2 | 9/2014 | Swann |
| 9,003,211 B2 | 4/2015 | Pfeiffer |
| 9,003,216 B2 | 4/2015 | Sankar et al. |
| 9,026,814 B2 | 5/2015 | Aasheim et al. |
| 9,027,024 B2 | 5/2015 | Mick et al. |
| 9,143,392 B2 | 9/2015 | Duchesneau |
| 9,207,993 B2 | 12/2015 | Jain |
| 9,218,035 B2 | 12/2015 | Li et al. |
| 9,252,598 B2 | 2/2016 | Belady et al. |
| 9,282,022 B2 | 3/2016 | Matthews et al. |
| 9,416,904 B2 | 8/2016 | Belady et al. |
| 9,477,279 B1 | 10/2016 | Piszczek et al. |
| 9,542,231 B2 | 1/2017 | Khan et al. |
| 9,552,234 B2 | 1/2017 | Boldyrev et al. |
| 9,557,792 B1 | 1/2017 | Potlapally et al. |
| 9,618,991 B1 | 4/2017 | Clidaras et al. |
| 9,645,596 B1 | 5/2017 | Lee et al. |
| 9,800,052 B2 | 10/2017 | Li et al. |
| 9,890,905 B2 | 2/2018 | Plummer et al. |
| 9,915,927 B2 | 3/2018 | Kobayashi |
| 9,946,815 B1 | 4/2018 | Weber et al. |
| 9,994,118 B2 | 6/2018 | Williams et al. |
| 10,033,210 B2 | 7/2018 | Peterson et al. |
| 10,250,039 B2 | 4/2019 | Wenzel et al. |
| 10,334,758 B1 | 6/2019 | Ramirez et al. |
| 10,340,696 B2 | 7/2019 | Paine et al. |
| 10,360,077 B2 | 7/2019 | Mahindru et al. |
| 10,367,335 B2 | 7/2019 | Kawashima et al. |
| 10,367,353 B1 | 7/2019 | McNamara et al. |
| 10,367,535 B2 | 7/2019 | Corse et al. |
| 10,444,818 B1 | 10/2019 | McNamara et al. |
| 10,452,127 B1 | 10/2019 | McNamara et al. |
| 10,452,532 B2 | 10/2019 | McVay et al. |
| 10,497,072 B2 | 12/2019 | Hooshmand et al. |
| 10,545,560 B2 | 1/2020 | Mahindru et al. |
| 10,608,433 B1 | 3/2020 | McNamara et al. |
| 10,618,427 B1 | 4/2020 | McNamara et al. |
| 10,637,353 B2 | 4/2020 | Ohyama et al. |
| 10,709,076 B2 | 7/2020 | Pham |
| 10,795,428 B2 | 10/2020 | Walsh |
| 10,819,599 B2 | 10/2020 | Mahindru et al. |
| 10,822,992 B2 | 11/2020 | Spears |
| 10,838,482 B2 | 11/2020 | Mahindru et al. |
| 10,857,899 B1 | 12/2020 | McNamara et al. |
| 10,862,307 B2 | 12/2020 | Cavness et al. |
| 10,862,309 B2 | 12/2020 | Cavness et al. |

(56) References Cited

U.S. PATENT DOCUMENTS

| | | |
|---|---|---|
| 10,873,211 B2 | 12/2020 | McNamara et al. |
| 10,931,117 B2 | 2/2021 | Shoemaker |
| 11,009,909 B2 | 5/2021 | Kuwabara et al. |
| 11,016,456 B2 | 5/2021 | Henson et al. |
| 11,016,458 B2 | 5/2021 | McNamara et al. |
| 11,016,553 B2 | 5/2021 | McNamara et al. |
| 11,025,060 B2 | 6/2021 | McNamara et al. |
| 11,031,787 B2 | 6/2021 | McNamara et al. |
| 11,031,813 B2 | 6/2021 | McNamara et al. |
| 11,042,948 B1 | 6/2021 | McNamara et al. |
| 11,128,165 B2 | 9/2021 | McNamara et al. |
| 11,163,280 B2 | 11/2021 | Henson et al. |
| 11,169,592 B2 | 11/2021 | Mahindru et al. |
| 11,194,150 B2 | 12/2021 | Baba |
| 11,256,320 B2 | 2/2022 | McNamara et al. |
| 11,275,427 B2 | 3/2022 | McNamara et al. |
| 11,283,261 B2 | 3/2022 | McNamara et al. |
| 11,342,746 B2 | 5/2022 | McNamara et al. |
| 11,397,999 B2 | 7/2022 | McNamara et al. |
| 11,418,037 B2 | 8/2022 | Cavness et al. |
| 11,431,195 B2 | 8/2022 | McNamara et al. |
| 11,451,059 B2 | 9/2022 | Cavness et al. |
| 11,537,183 B2 | 12/2022 | Lewis et al. |
| 11,669,144 B2 | 6/2023 | McNamara et al. |
| 11,669,920 B2 | 6/2023 | McNamara et al. |
| 11,682,902 B2 | 6/2023 | McNamara et al. |
| 2002/0158749 A1 | 10/2002 | Ikeda et al. |
| 2002/0196124 A1 | 12/2002 | Howard et al. |
| 2003/0037150 A1 | 2/2003 | Nakagawa |
| 2003/0074464 A1 | 4/2003 | Bohrer et al. |
| 2003/0171851 A1 | 9/2003 | Brickfield et al. |
| 2004/0027004 A1 | 2/2004 | Bayoumi et al. |
| 2004/0117330 A1 | 6/2004 | Ehlers et al. |
| 2005/0005528 A1 | 1/2005 | Brault et al. |
| 2005/0034128 A1 | 2/2005 | Nagashima et al. |
| 2005/0102539 A1 | 5/2005 | Hepner et al. |
| 2005/0154499 A1 | 7/2005 | Aldridge et al. |
| 2005/0165512 A1 | 7/2005 | Peljto |
| 2005/0203761 A1 | 9/2005 | Barr et al. |
| 2006/0031180 A1 | 2/2006 | Tamarkin et al. |
| 2006/0059772 A1 | 3/2006 | Brault et al. |
| 2006/0140747 A1 | 6/2006 | Vandervort et al. |
| 2006/0161765 A1 | 7/2006 | Cromer et al. |
| 2006/0253675 A1 | 11/2006 | Johannes Bloks |
| 2007/0228837 A1 | 10/2007 | Nielsen et al. |
| 2008/0000151 A1 | 1/2008 | Houweling et al. |
| 2008/0013596 A1 | 1/2008 | Dunne et al. |
| 2008/0030078 A1 | 2/2008 | Whitted et al. |
| 2008/0082844 A1 | 4/2008 | Ghiasi et al. |
| 2008/0094797 A1 | 4/2008 | Coglitore et al. |
| 2008/0238195 A1 | 10/2008 | Shaver et al. |
| 2009/0012523 A1 | 1/2009 | Ruuttu et al. |
| 2009/0055665 A1 | 2/2009 | Maglione et al. |
| 2009/0070611 A1 | 3/2009 | Bower, III et al. |
| 2009/0078401 A1 | 3/2009 | Cichanowicz |
| 2009/0089595 A1 | 4/2009 | Brey et al. |
| 2009/0144566 A1 | 6/2009 | Bletsch et al. |
| 2009/0254660 A1 | 10/2009 | Hanson et al. |
| 2010/0088261 A1 | 4/2010 | Montalvo |
| 2010/0211810 A1 | 8/2010 | Zacho |
| 2010/0235004 A1 | 9/2010 | Thind |
| 2010/0280675 A1 | 11/2010 | Tate, Jr. et al. |
| 2010/0313203 A1 | 12/2010 | Dawson et al. |
| 2010/0328849 A1 | 12/2010 | Ewing et al. |
| 2010/0333113 A1 | 12/2010 | Johnson et al. |
| 2011/0072289 A1 | 3/2011 | Kato |
| 2011/0115223 A1 | 5/2011 | Stahlkopf et al. |
| 2011/0239015 A1 | 9/2011 | Boyd et al. |
| 2011/0282527 A1 | 11/2011 | Inbarajan et al. |
| 2011/0316337 A1 | 12/2011 | Pelio et al. |
| 2012/0032665 A1 | 2/2012 | Shaver, II et al. |
| 2012/0072745 A1 | 3/2012 | Ahluwalia et al. |
| 2012/0078430 A1 | 3/2012 | Fan et al. |
| 2012/0109705 A1 | 5/2012 | Belady et al. |
| 2012/0150679 A1 | 6/2012 | Lazaris |
| 2012/0290865 A1 | 11/2012 | Kansal et al. |
| 2012/0300524 A1 | 11/2012 | Fornage et al. |
| 2012/0306271 A1 | 12/2012 | Kuriyama |
| 2012/0321309 A1 | 12/2012 | Barry et al. |
| 2012/0324245 A1 | 12/2012 | Sinha et al. |
| 2012/0326511 A1 | 12/2012 | Johnson |
| 2013/0006401 A1 | 1/2013 | Shan |
| 2013/0007515 A1 | 1/2013 | Shaw et al. |
| 2013/0054987 A1 | 2/2013 | Pfeiffer et al. |
| 2013/0063991 A1 | 3/2013 | Xiao et al. |
| 2013/0111494 A1 | 5/2013 | Hyser et al. |
| 2013/0117621 A1 | 5/2013 | Saraiya et al. |
| 2013/0187464 A1 | 7/2013 | Smith et al. |
| 2013/0213038 A1 | 8/2013 | Lazaris |
| 2013/0218356 A1 | 8/2013 | Lee et al. |
| 2013/0227139 A1 | 8/2013 | Suffling |
| 2013/0328395 A1 | 12/2013 | Krizman et al. |
| 2014/0020292 A1* | 1/2014 | McNamara ............ A01G 9/249 47/66.7 |
| 2014/0070756 A1 | 3/2014 | Kearns et al. |
| 2014/0075222 A1 | 3/2014 | Jackson |
| 2014/0114829 A1 | 4/2014 | Forbes, Jr. |
| 2014/0137468 A1 | 5/2014 | Ching |
| 2014/0149761 A1 | 5/2014 | Allen-Ware et al. |
| 2014/0150336 A1 | 6/2014 | Houweling |
| 2014/0180886 A1 | 6/2014 | Forbes, Jr. |
| 2014/0222225 A1 | 8/2014 | Rouse et al. |
| 2014/0230401 A1 | 8/2014 | Dunn |
| 2014/0365402 A1 | 12/2014 | Belady et al. |
| 2014/0365795 A1 | 12/2014 | Nielsen et al. |
| 2014/0379156 A1 | 12/2014 | Kamel et al. |
| 2015/0006940 A1 | 1/2015 | Kim et al. |
| 2015/0012113 A1 | 1/2015 | Celebi |
| 2015/0058845 A1 | 2/2015 | Song et al. |
| 2015/0106811 A1 | 4/2015 | Holler et al. |
| 2015/0121113 A1 | 4/2015 | Ramamurthy et al. |
| 2015/0155712 A1 | 6/2015 | Mondal |
| 2015/0212122 A1 | 7/2015 | Sobotka et al. |
| 2015/0229227 A1 | 8/2015 | Aeloiza et al. |
| 2015/0277410 A1 | 10/2015 | Gupta et al. |
| 2015/0278968 A1 | 10/2015 | Steven et al. |
| 2015/0278969 A1 | 10/2015 | Benoy et al. |
| 2015/0280492 A1 | 10/2015 | Narita |
| 2015/0288183 A1 | 10/2015 | Villanueva, Jr. et al. |
| 2015/0363132 A1 | 12/2015 | Uehara |
| 2015/0371328 A1 | 12/2015 | Gabel et al. |
| 2015/0372538 A1 | 12/2015 | Siegler et al. |
| 2016/0006066 A1 | 1/2016 | Robertson |
| 2016/0011617 A1 | 1/2016 | Liu et al. |
| 2016/0043552 A1 | 2/2016 | Villanueva, Jr. et al. |
| 2016/0054774 A1 | 2/2016 | Song et al. |
| 2016/0087909 A1 | 3/2016 | Chatterjee et al. |
| 2016/0091948 A1 | 3/2016 | Mitchell et al. |
| 2016/0109916 A1 | 4/2016 | Li et al. |
| 2016/0126783 A1 | 5/2016 | Cheng et al. |
| 2016/0170469 A1 | 6/2016 | Sehgal et al. |
| 2016/0172900 A1 | 6/2016 | Welch, Jr. |
| 2016/0187906 A1 | 6/2016 | Bodas et al. |
| 2016/0198656 A1 | 7/2016 | McNamara et al. |
| 2016/0202744 A1 | 7/2016 | Castro-Leon |
| 2016/0212954 A1 | 7/2016 | Argento |
| 2016/0248631 A1 | 8/2016 | Duchesneau |
| 2016/0261226 A1 | 9/2016 | Hamilton et al. |
| 2016/0324077 A1 | 11/2016 | Frantzen et al. |
| 2016/0329708 A1 | 11/2016 | Day |
| 2016/0377306 A1 | 12/2016 | Drees et al. |
| 2017/0023969 A1 | 1/2017 | Shows et al. |
| 2017/0104336 A1 | 4/2017 | Elbsat et al. |
| 2017/0104337 A1 | 4/2017 | Drees |
| 2017/0104342 A1 | 4/2017 | Eibsat et al. |
| 2017/0104343 A1 | 4/2017 | Eibsat et al. |
| 2017/0185132 A1 | 6/2017 | Bodas et al. |
| 2017/0192483 A1 | 7/2017 | Boss et al. |
| 2017/0194791 A1 | 7/2017 | Budde |
| 2017/0201098 A1 | 7/2017 | Carpenter |
| 2017/0214070 A1 | 7/2017 | Wang et al. |
| 2017/0237261 A1 | 8/2017 | Maug et al. |
| 2017/0261949 A1 | 9/2017 | Hoffmann et al. |
| 2017/0300359 A1 | 10/2017 | Kollur et al. |

(56) References Cited

U.S. PATENT DOCUMENTS

| | | |
|---|---|---|
| 2017/0366412 A1 | 12/2017 | Piga |
| 2017/0373500 A1 | 12/2017 | Shafi et al. |
| 2018/0026478 A1 | 1/2018 | Peloso |
| 2018/0052431 A1 | 2/2018 | Shaikh et al. |
| 2018/0101220 A1 | 4/2018 | Mahindru et al. |
| 2018/0105051 A1 | 4/2018 | Zheng et al. |
| 2018/0116070 A1 | 4/2018 | Broadbent et al. |
| 2018/0144414 A1 | 5/2018 | Lee et al. |
| 2018/0166881 A1 | 6/2018 | Suryanarayana et al. |
| 2018/0175666 A1 | 6/2018 | Ayer et al. |
| 2018/0202825 A1 | 7/2018 | You et al. |
| 2018/0240112 A1 | 8/2018 | Castinado et al. |
| 2018/0267839 A1 | 9/2018 | Maisuria et al. |
| 2018/0294649 A1 | 10/2018 | Bright et al. |
| 2018/0356770 A1 | 12/2018 | Eibsat et al. |
| 2018/0366978 A1 | 12/2018 | Matan et al. |
| 2018/0367320 A1 | 12/2018 | Montalvo |
| 2019/0052094 A1 | 2/2019 | Pmsvvsv et al. |
| 2019/0082618 A1 | 3/2019 | Lopez |
| 2019/0168630 A1 | 6/2019 | Mrlik et al. |
| 2019/0173283 A1 | 6/2019 | Epel et al. |
| 2019/0258307 A1 | 8/2019 | Shaikh et al. |
| 2019/0280521 A1 | 9/2019 | Lundstrom et al. |
| 2019/0318327 A1 | 10/2019 | Sowell et al. |
| 2019/0324820 A1 | 10/2019 | Krishnan et al. |
| 2019/0339756 A1 | 11/2019 | Lewis et al. |
| 2020/0019230 A1 | 1/2020 | Rong et al. |
| 2020/0051184 A1 | 2/2020 | Barbour |
| 2020/0167197 A1 | 5/2020 | Bahramshahry et al. |
| 2020/0177100 A1 | 6/2020 | Wang et al. |
| 2020/0318843 A1 | 10/2020 | Wenzel et al. |
| 2020/0321776 A1 | 10/2020 | Shaver, II et al. |
| 2021/0021135 A1 | 1/2021 | Eibsat et al. |
| 2021/0036547 A1 | 2/2021 | McNamara et al. |
| 2021/0101499 A1 | 4/2021 | McNamara et al. |
| 2021/0126276 A1 | 4/2021 | McNamara et al. |
| 2021/0175710 A1 | 6/2021 | Campbell et al. |
| 2021/0287309 A1 | 9/2021 | Gebhardt et al. |
| 2021/0294405 A1 | 9/2021 | McNamara et al. |
| 2021/0296893 A1 | 9/2021 | McNamara et al. |
| 2021/0296928 A1 | 9/2021 | McNamara et al. |
| 2021/0298195 A1 | 9/2021 | Barbour |
| 2022/0033517 A1 | 2/2022 | Hendry et al. |
| 2022/0039333 A1 | 2/2022 | Avila |
| 2022/0294219 A1 | 9/2022 | McNamara et al. |
| 2022/0366517 A1 | 11/2022 | McNamara et al. |
| 2022/0407350 A1 | 12/2022 | McNamara et al. |
| 2023/0208138 A1 | 6/2023 | McNamara et al. |
| 2023/0275432 A1 | 8/2023 | McNamara et al. |

FOREIGN PATENT DOCUMENTS

| | | |
|---|---|---|
| CN | 102185382 A | 9/2011 |
| CN | 102591921 A | 7/2012 |
| CN | 103163904 A | 6/2013 |
| CN | 103440028 A | 12/2013 |
| CN | 103748757 A | 4/2014 |
| CN | 104144183 A | 11/2014 |
| CN | 104715340 A | 6/2015 |
| CN | 104969434 A | 10/2015 |
| CN | 106226718 A | 12/2016 |
| CN | 107967536 A | 4/2018 |
| EP | 3850462 A1 | 7/2021 |
| EP | 3850465 A4 | 6/2022 |
| JP | 2011123873 A | 6/2011 |
| JP | 2013524317 A | 6/2013 |
| JP | 2017530449 A | 10/2017 |
| KR | 20090012523 A | 2/2009 |
| WO | WO-2008039773 A2 | 4/2008 |
| WO | WO-2010050249 A1 | 5/2010 |
| WO | WO-2014005156 A2 | 1/2014 |
| WO | WO-2015039122 A1 | 3/2015 |
| WO | WO-2015199629 A1 | 12/2015 |
| WO | WO-2017163126 A1 | 9/2017 |
| WO | WO-2018068042 A1 | 4/2018 |
| WO | WO-2019060180 A2 | 3/2019 |
| WO | WO-2019116375 A1 | 6/2019 |
| WO | WO-2019139632 A1 | 7/2019 |
| WO | WO-2019139633 A1 | 7/2019 |
| WO | WO-2020056308 A1 | 3/2020 |
| WO | WO-2020056319 A1 | 3/2020 |
| WO | WO-2020056322 A1 | 3/2020 |
| WO | WO-2020227811 A1 | 11/2020 |
| WO | WO-2022031836 A1 | 2/2022 |

OTHER PUBLICATIONS

Advisory Action mailed on Nov. 13, 2020 for U.S. Appl. No. 16/529,360, filed Aug. 1, 2019, 182 pages.

Advisory Action mailed on Mar. 22, 2023 for U.S. Appl. No. 17/101,784, filed Nov. 23, 2020, 3 pages.

Advisory Action mailed on Oct. 22, 2020 for U.S. Appl. No. 16/528,348, filed Jul. 31, 2019, 3 pages.

Bakar et al., "Microgrid and Load Shedding Scheme During Islanded Mode: a Review," Elsevier, May 26, 2020, vol. 71, pp. 161-169. https://www.sciencedirect.com/science/article/pii/S1364032116311030.

Bird et al., "Wind and Solar Energy Curtailment: Experience and Practices in the United States," National Renewable Energy Lab (NREL), Technical Report NREL/TP-6A20-60983, Mar. 2014, 58 pages.

Chen et al., "Power Trading Model for Distributed Power Generation Systems Based on Consortium Blockchains," Proceedings of the 12th Asia-Pacific Symposium on Internetware, Jul. 2021, pp. 91-98. https://doi.org/10.1145/3457913.3457929.

Choi et al., "Optimal Load Shedding for Maximizing Satisfaction in an Islanded Microgrid," Energies, 2017, vol. 10, pp. 45. doi: 10.3390/en10010045.

EPEX Spot, "How They Occur, What They Mean," 2018, 2 pages. Retrieved from Internet:[URL: https://www.epexspot.com/en/company-info/basics_of_the_power_market/negative_prices ].

ERCOT, Business Procedures, Load Resource Qualification, Initial Qualification and Periodic Testing, Controllable Load Qualification Test Procedure for Ancillary Services (Jun. 1, 2014).

ERCOT, Business Procedures, Load Resource Qualification, Non-Controllable Load Resource Qualification and Testing Procedure, V1.1 (Apr. 1, 2011).

ERCOT, Controllable Load Resource (CLR) Participation in the ERCOT Market (Dec. 20, 2007).

ERCOT, Emergency Response Service Technical Requirements & Scope of Work, Oct. 1, 2018 through Jan. 31, 2019.

ERCOT, ERS QSE Training 101, Updated Apr. 6, 2022.

ERCOT, Large Flexible Load Resource Participation in the ERCOT Region, presentation to Large Flexible Load Task Force (Apr. 26, 2022).

ERCOT, Load Resource Participation in the ERCOT Region, presentation (Sep. 27, 2022).

ERCOT, Nodal Protocols (Oct. 18, 2019)—Applicant particularly notes the following pp. 2-4, 2-5, 2-15, 2-17, 2-24 to 26, 2-28, 2-29, 2-38, 2-41, 2-51, 2-52, 2-58, 2-62 to 63, 2-67, 2-69, 3-77 to 80, 3-176 to 3-186, 3-208 to 213, 3-214 to 216, 4-1 to 4, 4-10, 4-20, 4-25 to 27, 4-59 to 62, 4-64 to 67, 6-100 to 116, 8-1 to 58.

European Patent Application No. 19878191.6, Extended European Search Report dated Jul. 4, 2022.

European Patent Application No. 18900411.2, Extended European Search Report dated Dec. 13, 2021.

European Patent Application No. 19858739.6, Extended European Search Report dated May 31, 2022.

European Patent Application No. 19858812.1, Extended European Search Report dated May 2, 2022.

European Patent Application No. 19861222.8, Extended European Search Report dated May 2, 2022.

European Patent Application No. 19861223.6, Extended European Search Report dated Apr. 19, 2022.

European Patent Application No. 19877576.9, Extended European Search Report dated Jun. 3, 2022.

European Patent Application No. 20738289.6, Extended European Search Report dated Aug. 8, 2022.

(56) References Cited

OTHER PUBLICATIONS

European Patent Application No. 22157111.0, Extended European Search Report dated Aug. 17, 2022.
European Patent Application No. EP18900411.2, Partial Supplementary European Search Report dated Sep. 9, 2021.
Examination Report mailed Jan. 17, 2023 for EP Application No. EP19858812.1 filed on Mar. 25, 2021.
Examination Report mailed Dec. 9, 2022 for EP Application No. EP2019086122.3 filed on Sep. 13, 2019.
Final Office Action mailed Jul. 23, 2020 on for U.S. Appl. No. 16/132,062, filed Sep. 14, 2018, 26 pages.
Final Office Action mailed on May 19, 2020 for U.S. Appl. No. 16/809,111, filed Mar. 4, 2020, 36 pages.
Final Office Action mailed on Jun. 3, 2020 for U.S. Appl. No. 16/528,348, filed Jul. 31, 2019, 33 pages.
Final Office Action mailed on May 28, 2020 for U.S. Appl. No. 16/132,098, filed Sep. 14, 2018, 24 pages.
Final Office Action mailed Jan. 6, 2022 on for U.S. Appl. No. 16/529,360, filed Aug. 1, 2019, 40 pages.
Final Office Action mailed Aug. 9, 2021 on for U.S. Appl. No. 16/529,402, filed Aug. 1, 2019, 43 pages.
Final Office Action mailed Aug. 9, 2021 on for U.S. Appl. No. 16/573,577, filed Sep. 17, 2019, 16 pages.
Final Office Action mailed Jul. 9, 2021 on for U.S. Appl. No. 16/525,142, filed Jul. 29, 2019, 18 pages.
Final Office Action mailed Apr. 11, 2023 on for U.S. Appl. No. 16/529,360, filed Aug. 1, 2019, 46 pages.
Final Office Action mailed on Oct. 1, 2019 for U.S. Appl. No. 16/175,246, filed Oct. 30, 2018, 18 pages.
Final Office Action mailed on Dec. 1, 2022 for U.S. Appl. No. 17/101,784, filed Mar. 16, 2013, 14 pages.
Final Office Action mailed on Apr. 17, 2020 for U.S. Appl. No. 16/529,402, filed Aug. 1, 2019, 59 pages.
Final Office Action mailed on Jan. 20, 2023 for U.S. Appl. No. 17/331,440, filed May 26, 2021, 17 pages.
Final Office Action mailed on Jul. 29, 2020 for U.S. Appl. No. 16/132,092, filed Sep. 14, 2018, 5 pages.
Gao et al., "Dynamic Load Shedding for an Islanded Microgrid With Limited Generation Resources," IET Generation, Transmission & Distribution, Sep. 2016, vol. 10(12), pp. 2953-2961. doi: 10.1049/iet-gtd.2015.1452.
Ghamkhari et al., "Energy and Performance Management of Green Data Centers: A Profit Maximization Approach," IEEE Transactions on Smart Grid, Jun. 2013, vol. 4 (2), pp. 1017-1025.
Ghamkhari et al., "Optimal Integration of Renewable Energy Resources in Data Centers with Behind-the-Meter Renewable Generator," Department of Electrical and Computer Engineering Texas Tech University, 2012, pp. 3340-3444.
Ghatikar et al., "Demand Response Opportunities and Enabling Technologies for DataCenters: Findings from Field Studies," Lawrence Berkeley National Laboratory, Aug. 2012, 57 pages.
Hayes, Adam S., "A Cost of Production Model for Bitcoin," Department of Economics, The New School for Social Research, Mar. 2015, 5 pages.
Huang et al., "Data Center Energy Cost Optimization in Smart Grid: a Review," Journal of Zhejiang University (Engineering Science), 2016, vol. 50 (12), pp. 2386-2399.
Hung et al., "Application of Improved Differential Evolution Algorithm for Economic and Emission Dispatch of Thermal Power Generation Plants," Proceedings of the 3rd International Conference on Machine Learning and Soft Computing, Jan. 2019, pp. 93-98. https://doi.org/10.1145/3310986.3311003.
International Search Report and Written Opinion of PCT Application No. PCT/US2018/017955, mailed on Apr. 30, 2018, 22 pages.
International Search Report and Written Opinion of PCT Application No. PCT/US2018/017950, mailed on May 31, 2018, 15 pages.
International Search Report and Written Opinion of PCT Application No. PCT/US2020/044536, mailed on Aug. 26, 2020, 24 pages.
International Search Report and Written Opinion of PCT Application No. PCT/US2020/044539, mailed on Aug. 26, 2020, 7 pages.
International Search Report and Written Opinion of PCT Application No. PCT/US2021/019875, mailed on Apr. 29, 2021, 12 pages.
International Search Report and Written Opinion of PCT Application No. PCT/US2021/045972, mailed on Nov. 15, 2021, 16 pages.
International Search Report and Written Opinion of PCT Application No. PCT/US20/57686, mailed on Feb. 22, 2021, 67 pages.
ISO, "Distributed Energy Resources Roadmap for New York's Wholesale Electricity Markets," Distributed Energy Resource Roadmap, Jan. 2017, pp. 1-39. [retrieved on Dec. 15, 2020], Retrieved from the Internet: <url: https://www.nyiso.com/documents/20142/1391862/Distributed_Energy_Resources_Roadmap.pdf/ec0b3b64-4de2-73e0-ffef-49a4b8b1 b3ca.</url:>.
John, "Stem and CPower to Combine Behind-the-Meter Batteries and Demand Response," Energy Storage, Aug. 8, 2017, 1 pages.
Kewl, "Start-Up From the Heart of Berlin Has Pioneered Decentralized Mobile Mining by Combining Blockchain With Regenerative Energy" Nov. 13, 2017, 3 pages. Retrieved from Internet:[URL: www.crypto-news.net/ start-up-from-the-heart-of-berlin-has-pioneered-decentralized-mobile-mining-by-combining-blockchain-with-regenerative-energy/].
Kiani et al., "Profit Maximization for Geographical Dispersed Green Data Centers," Arxiv.org, Cornell University Library, 201 Olin Library Cornell University Ithaca, Apr. 2015, pp. 1-5.
Kim et al., "Automated di/dt Stressmark Generation for Microprocessor Power Delivery Networks," IEEE/ACM International Symposium on Low Power Electronics and Design, Aug. 2011, pp. 253-258.
KO., "Ultra-Low Power Challenges for the next Generation ASIC," International Symposium on Low Power Electronics and Design, Jul. 2012, pp. 365-366. https://doi.org/10.1145/2333660.2333743.
Li et al., "iSwitch: Coordinating and Optimizing Renewable Energy Powered Server Clusters," 2012 39th Annual International Symposium on Computer Architecture, Jun. 2012, pp. 512-523.
Li et al., "Research on Evaluation Method of Integrated Energy Service Level of Power Generation Enterprises," Informatics, Environment, Energy and Applications, Jun. 2021, pp. 57-62. https://doi.org/10.1145/3458359.3458372.
Lim et al., "Distributed Load-shedding System for Agent-based Autonomous Microgrid Operations," Energies, 2014, vol. 7(1), pp. 385-401. doi: 10.3390/en7010385.
Lin et al., "Automated Classification of Power Plants by Generation Type," E-Energy '20: Proceedings of the Eleventh ACM International Conference on Future Energy Systems, Jun. 2020, pp. 86-96. https://doi.org/10.1145/3396851.3397708.
Liu et al., "Improved Average Consensus Algorithm Based Distributed Cost Optimization for Loading Shedding of Autonomous Microgrids," International Journal of Electrical Power & Energy Systems, Dec. 2015, vol. 73, pp. 89-96. doi: 10.1016/j.ijepes.2015.04.006.
Marcano et al., "Soil Power?: Can Microbial Fuel Cells Power Non-Trivial Sensors?," LP-IoT'21, Proceedings of the 1st ACM Workshop on No. Power and Low Power Internet-of-Things, Jan. 2022, pp. 8-13. https://doi.org/10.1145/3477085.3478989.
McNamara et al., U.S. Appl. No. 16/175,246, mailed on Oct. 30, 2018, 64 pages.
Miyazaki et al., "Electric-Energy Generation Using Variable-Capacitive Resonator for Power-Free LSI: Efficiency Analysis and Fundamental Experiment," International Symposium on Low Power Electronics and Design, Aug. 2003, pp. 193-198, Doi: 10.1109/LPE.2003.1231861.
Mousavizadeh et al., "A Linear Two-stage Method for Resiliency Analysis in Distribution Systems Considering Renewable Energy and Demand Response Resources," Elsevier, 2017, pp. 443-460. doi: 10.1016/j.apenergy.2017.11.067.
Nawaz et al., "Assisting the Power Generation Sector Toward Sustainability—an Lot Based System for Power Theft Detection With Theft Location Identification," Proceedings of the 2nd International Conference on Computing Advancements, Aug. 2022, pp. 309-315, https://doi.org/10.1145/3542954.3542999.
Non-Final Office Action mailed on Dec. 5, 2019 for U.S. Appl. No. 16/529,360, filed Aug. 1, 2019, 72 pages.
Non-Final Office Action mailed on Dec. 10, 2019 for U.S. Appl. No. 16/596,190, filed Oct. 8, 2019, 72 pages.

(56) References Cited

OTHER PUBLICATIONS

Non-Final Office Action mailed on Jun. 12, 2020 for U.S. Appl. No. 16/803,109, filed Dec. 27, 2020, 31 pages.
Non-Final Office Action mailed on Nov. 14, 2019 for U.S. Appl. No. 16/132,098, filed Sep. 14, 2018, 25 pages.
Non-Final Office Action mailed on Feb. 20, 2020 for U.S. Appl. No. 16/702,894, filed Dec. 4, 2019, 30 pages.
Non-Final Office Action mailed on Nov. 21, 2019 for U.S. Appl. No. 16/529,402, filed Aug. 1, 2019, 57 pages.
Non-Final Office Action mailed Feb. 4, 2021 on for U.S. Appl. No. 16/284,610, filed Feb. 25, 2019, 9 pages.
Non-Final Office Action mailed Apr. 1, 2021 on for U.S. Appl. No. 16/482,495, filed Jul. 31, 2019, 59 pages.
Non-Final Office Action mailed Apr. 2, 2020 on for U.S. Appl. No. 16/132,011, filed Sep. 14, 2018, 5 pages.
Non-Final Office Action mailed Aug. 6, 2012 for U.S. Appl. No. 12/587,564, filed Oct. 8, 2009, 24 pages.
Non-Final Office Action mailed Oct. 6, 2022 on for U.S. Appl. No. 17/331,440, filed May 26, 2021, 4 pages.
Non-Final Office Action mailed Nov. 7, 2022 on for U.S. Appl. No. 17/692,636, filed Mar. 11, 2022, 9 pages.
Non-Final Office Action mailed Dec. 8, 2022 for U.S. Appl. No. 17/340,643, filed Jun. 7, 2021, 5 pages.
Non-Final Office Action mailed Mar. 8, 2021 on for U.S. Appl. No. 16/525,142, filed Jul. 29, 2019, 71 pages.
Non-Final Office Action mailed Dec. 11, 2019 on for U.S. Appl. No. 16/132,062, filed Sep. 14, 2018, 17 pages.
Non-Final Office Action mailed May 11, 2023 for U.S. Appl. No. 18/114,503, filed Feb. 27, 2023.
Non-Final Office Action mailed Feb. 12, 2021 on for U.S. Appl. No. 16/528,348, filed Jul. 31, 2019, 54 pages.
Non-Final Office Action mailed May 14, 2020 on for U.S. Appl. No. 16/834,987, filed Mar. 30, 2020, 30 pages.
Non-Final Office Action mailed Mar. 17, 2023 for U.S. Appl. No. 17/868,381, filed Jul. 19, 2022, 49 pages.
Non-Final Office Action mailed Sep. 21, 2018 for U.S. Appl. No. 15/289,272, filed Oct. 10, 2016, 27 pages.
Non-Final Office Action mailed Sep. 22, 2022 on for U.S. Appl. No. 16/961,386, filed Jul. 10, 2020, 52 pages.
Non-Final Office Action mailed Dec. 24, 2021 on for U.S. Appl. No. 17/128,830, filed Dec. 21, 2020, 4 pages.
Non-Final Office Action mailed Apr. 25, 2023 for U.S. Appl. No. 17/340,643, filed Jun. 7, 2021, 4 pages.
Non-Final Office Action mailed Aug. 25, 2022 on for U.S. Appl. No. 16/529,360, filed Aug. 1, 2019, 91 pages.
Non-Final Office Action mailed Mar. 25, 2021 on for U.S. Appl. No. 16/573,577, filed Sep. 17, 2019, 65 pages.
Non-Final Office Action mailed Mar. 29, 2023 for U.S. Appl. No. 18/066,616, filed Dec. 15, 2022, 120 pages.
Non-Final Office Action mailed Sep. 29, 2022 on for U.S. Appl. No. 17/353,285, filed Jun. 21, 2021, 16 pages.
Non-Final Office Action mailed on Dec. 10, 2019 for U.S. Appl. No. 16/528,348, filed Jul. 31, 2019, 33 pages.
Non-Final Office Action mailed on Apr. 11, 2023 for U.S. Appl. No. 17/353,285, filed Jun. 21, 2021, 4 pages.
Non-Final Office Action mailed on May 11, 2021 for U.S. Appl. No. 16/529,360, filed Aug. 1, 2019, 64 pages.
Non-Final Office Action mailed on Dec. 20, 2022, for U.S. Appl. No. 17/513,558, filed Oct. 28, 2021, 16 pages.
Non-Final Office Action mailed on May 28, 2021 for U.S. Appl. No. 16/658,983, filed Oct. 21, 2019, 21 pages.
Non-Final Office Action mailed on Mar. 30, 2020 for U.S. Appl. No. 16/132,092, filed Sep. 14, 2018, 46 pages.
Notice of Allowance mailed May 12, 2021 on for U.S. Appl. No. 16/132,062, filed Sep. 14, 2018, 2 pages.
Notice of Allowance mailed Oct. 13, 2020 on for U.S. Appl. No. 16/132,098, filed Sep. 14, 2018, 5 pages.
Notice of Allowance mailed Dec. 2, 2022 for U.S. Appl. No. 17/328,337, filed May 24, 2021, 5 pages.
Notice of Allowance mailed Jun. 12, 2020 on for U.S. Appl. No. 16/834,987, filed Mar. 30, 2020, 9 pages.
Notice of Allowance mailed on Jun. 9, 2021 for U.S. Appl. No. 16/528,348, filed Jul. 31, 2019, 11 pages.
Notice of Allowance mailed Dec. 2, 2022 on for U.S. Appl. No. 17/673,318, filed Feb. 16, 2022, 17 pages.
Notice of Allowance mailed Nov. 2, 2022 on for U.S. Appl. No. 17/340,886, filed Jun. 7, 2021, 9 pages.
Notice of Allowance mailed Feb. 8, 2021 on for U.S. Appl. No. 16/132,062, filed Sep. 14, 2018, 21 pages.
Notice of Allowance mailed Feb. 8, 2021 on for U.S. Appl. No. 16/803,109, filed Feb. 27, 2020, 29 pages.
Notice of Allowance mailed Feb. 8, 2021 on for U.S. Appl. No. 16/834,987, filed Mar. 30, 2020, 180 pages.
Notice of Allowance mailed Aug. 10, 2022 on for U.S. Appl. No. 17/328,337, filed May 24, 2021, 9 pages.
Notice of Allowance mailed Jan. 13, 2021 on for U.S. Appl. No. 16/175,246, filed Oct. 30, 2018, 5 pages.
Notice of Allowance mailed Sep. 17, 2020 on for U.S. Appl. No. 16/175,246, filed Oct. 30, 2018, 5 pages.
Notice of Allowance mailed Nov. 19, 2020 on for U.S. Appl. No. 16/132,062, filed Sep. 14, 2018, 7 pages.
Notice of Allowance mailed Apr. 20, 2021 on for U.S. Appl. No. 16/482,495, filed Jul. 31, 2019, 5 pages.
Notice of Allowance mailed Nov. 23, 2022 on for U.S. Appl. No. 17/340,664, filed Jun. 7, 2021, 2 pages.
Notice of Allowance mailed Jan. 25, 2021 on for U.S. Appl. No. 16/132,098, filed Sep. 14, 2018, 5 pages.
Notice of Allowance mailed Jan. 25, 2021 on for U.S. Appl. No. 16/702,894, filed Dec. 4, 2019, 24 pages.
Notice of Allowance mailed Jul. 26, 2021 on for U.S. Appl. No. 16/284,610, filed Feb. 25, 2019, 2 pages.
Notice of Allowance mailed Jan. 27, 2021 on for U.S. Appl. No. 16/132,092, filed Sep. 14, 2018, 8 pages.
Notice of Allowance mailed May 27, 2021 on for U.S. Appl. No. 16/284,610, filed Feb. 25, 2019, 16 pages.
Notice of Allowance mailed Jul. 29, 2020 on for U.S. Appl. No. 16/132,011, filed Sep. 14, 2018, 5 pages.
Notice of Allowance mailed Oct. 29, 2020 on for U.S. Appl. No. 16/132,092, filed Sep. 14, 2018, 8 pages.
Notice of Allowance mailed May 31, 2022 on for U.S. Appl. No. 16/529,402, filed Aug. 1, 2019 13 pages.
Notice of Allowance mailed Oct. 8, 2021 on for U.S. Appl. No. 16/528,348, filed Jul. 31, 2019, 3 pages.
Notice of Allowance mailed on Apr. 2, 2019, for U.S. Appl. No. 16/175,335, filed Oct. 30, 2018, 12 pages.
Notice of Allowance mailed on Mar. 2, 2020, for U.S. Appl. No. 16/596,190, filed Oct. 8, 2019, 15 pages.
Notice of Allowance mailed on Aug. 3, 2022, for U.S. Appl. No. 17/340,886, filed Jun. 7, 2021, 09 pages.
Notice of Allowance mailed on Feb. 3, 2022, for U.S. Appl. No. 16/573,577, filed Sep. 17, 2019, 8 pages.
Notice of Allowance mailed on Apr. 4, 2023, for U.S. Appl. No. 17/673,318, filed Feb. 16, 2022, 2 pages.
Notice of Allowance mailed on Jan. 5, 2022, for U.S. Appl. No. 16/658,983, filed Oct. 21, 2019, 14 pages.
Notice of Allowance mailed on Apr. 6, 2020, for U.S. Appl. No. 16/175,246, filed Oct. 30, 2018, 12 pages.
Notice of Allowance mailed on Mar. 8, 2023, for U.S. Appl. No. 16/961,386, filed Jul. 10, 2020, 2 pages.
Notice of Allowance mailed on Nov. 9, 2022, for U.S. Appl. No. 17/340,664, filed Dec. 16, 2013, 4 pages.
Notice of Allowance mailed on Jan. 13, 2023, for U.S. Appl. No. 16/961,386, filed Jul. 10, 2020, 13 pages.
Notice of Allowance mailed on Aug. 15, 2019, for U.S. Appl. No. 16/175,146, filed Oct. 30, 2018, 17 pages.
Notice of Allowance mailed on Apr. 18, 2022, for U.S. Appl. No. 17/128,830, filed Dec. 21, 2020, 7 pages.
Notice of Allowance mailed on Feb. 21, 2023, for U.S. Appl. No. 17/340,664, filed Jun. 7, 2021, 2 pages.
Notice of Allowance mailed on Mar. 21, 2023 for U.S. Appl. No. 17/692,636, filed Mar. 11, 2022, 09 pages.

(56) References Cited

OTHER PUBLICATIONS

Notice of Allowance mailed on Feb. 23, 2022, for U.S. Appl. No. 16/525,142, filed Jul. 29, 2019, 5 pages.
Notice of Allowance mailed on Feb. 23, 2023, for U.S. Appl. No. 17/353,285, filed Jun. 21, 2021, 5 pages.
Notice of Allowance mailed on Apr. 24, 2023, for U.S. Appl. No. 16/961,386, filed Jul. 10, 2020, 10 pages.
Notice of Allowance mailed on Apr. 24, 2023 for U.S. Appl. No. 17/692,636, filed Mar. 11, 2022, 08 pages.
Notice of Allowance mailed on Apr. 24, 2023 for U.S. Appl. No. 17/750,883, filed May 23, 2022, 10 pages.
Notice of Allowance mailed on Jan. 24, 2022, for U.S. Appl. No. 16/525,142, filed Jul. 29, 2019, 9 pages.
Notice of Allowance mailed on Sep. 24, 2021 for U.S. Appl. No. 16/528,348, filed Jul. 31, 2019, 06 pages.
Notice of Allowance mailed on Jan. 26, 2022, for U.S. Appl. No. 17/328,275, filed May 24, 2021, 10 pages.
Notice of Allowance mailed on Jan. 27, 2020, for U.S. Appl. No. 16/702,931, filed Dec. 4, 2019, 23 pages.
Notice of Allowance mailed on Jul. 29, 2019, for U.S. Appl. No. 16/245,532, filed Jan. 11, 2019, 13 pages.
Pashajavid et al., "A Multimode Supervisory Control Scheme for Coupling Remote Droop-Regulated Microgrids," IEEE Transactions on Smart Grid, May 26, 2020, vol. 9(5), pp. 5381-5392. https://ieeexplore.ieee.org/abstract/document/7888570/.
Pashajavid et al., "Frequency Support for Remote Microgrid Systems With Intermittent Distributed Energy Resources—A Two-level Hierarchical Strategy," IEEE Systems Journal, May 26, 2020, vol. 12(3), pp. 2760-2771. https://ieeexplore.ieee.org/abstract/document/7862156/.
Rahimi, Farrokh, "Using a Transactive Energy Framework," IEEE Electrification Magazine, Dec. 2016, pp. 23-29.
Response to Non-Final Office Action mailed Feb. 6, 2021 for U.S. Appl. No. 12/587,564, filed Oct. 8, 2009, 14 pages.
Response to Non-Final Office Action mailed Dec. 21, 2018 for U.S. Appl. No. 15/289,272, filed Oct. 10, 2016, 10 pages.
Rudez and Mihalic, "Predictive Underfrequency Load Shedding Scheme for Islanded Power Systems With Renewable Generation," Electric Power Systems Research, May 2015, vol. 126, pp. 21-28. doi: 10.1016/j.epsr.2015.04.017.
Sakurai., "Next-Generation Power-Aware Design," ISLPED, Aug. 2008, pp. 383-384.
Sankaragomathi et al., "Optimal Power and Noise for Analog and Digital Sections of a Low Power Radio Receiver," International Symposium on Low Power Electronics & Design, Aug. 2008, pp. 271-276. https://doi.org/10.1145/1393921.1393993.
Sethuraman et al., "Multicasting Based Topology Generation and Core Mapping for a Power Efficient Networks-On-Chip," International Symposium on Low Power Electronics & Design, Aug. 2007, pp. 399-402. https://doi.org/10.1145/1283780.1283868.
Sharma et al., "Microgrids: A New Approach to Supply-Side Design for Data Centers," 2009, 7 pages.
Singh et al., "Targeted Random Test Generation for Power-Aware Multicore Designs," ACM Transactions on Design Automation of Electronic Systems, Jun. 2012, vol. 17(3), pp. 1-19. https://doi.org/10.1145/2209291.2209298.
Soluna., "Powering the Block Chain," Aug. 2018, version 1.1, 29 pages.
Tao et al., "Simulation Model of Photo-Voltaic Grid-Connected Power Generation," Artificial Intelligence and Advanced Manufacture, Mar. 2022, pp. 2921-2926. https://doi.org/10.1145/3495018.3501208.
U.S. Appl. No. 62/556,880, filed Sep. 11, 2017, 8 pages.
Villani et al., "RF Power Transmission:Energy Harvesting for Self-Sustaining Miniaturized Sensor Nodes," Embedded Networked Sensor Systems, Sensys, Nov. 2021, pp. 592-593. https://doi.org/10.1145/3485730.3493365.
Wang et al., "SHIP: Scalable Hierarchical Power Control for Large-scale Data Centers," 2009 18th International Conference onParallel Architectures and Compilation Techniques, Sep. 2009, pp. 91-100.
Wierman et al., "Opportunities and Challenges for Data Center Demand Response," International Green Computing Conference, IEEE, Nov. 2014, pp. 1-10.
Wilson, Joseph Nathanael, "A Utility-Scale Deployment Project of Behind-the-Meter Energy Storage for Use in Ancillary Services, Energy Resiliency, Grid Infrastructure Investment Deferment, and Demand-Response Integration," Portland State University, 2016, 154 pages.
Xu et al., "Distributed Load Shedding for Microgrid With Compensation Support via Wireless Network," IET Generation, Transmission & Distribution, May 2018, vol. 12(9), pp. 2006-2018. doi: 10.1049/iet-gtd.2017.1029.
Yang et al., "Investment Value Analysis of Household Rooftop PV Power Generation Project under Carbon Trading Mode," Information Management and Management Science, Aug. 2019, pp. 160-165. https://doi.org/10.1145/3357292.3357330.
Yaramasu V., et al., "High-Power Wind Energy Conversion Systems: State-of-the-Art and Emerging Technologies", Proceedings of the IEEE, May 2015, vol. 103 (5), 49 pages.
Zhang et al., "Calculation of the Carrying Capacity of Distrubuted Power Generation in Distribution Network Under Carbon Peaking and Carbon Neutrality Goals," Electrical, Power and Computer Engineering, Apr. 2022, pp. 1-5. https://doi.org/10.1145/3529299.3529308.
Zhang et al., "Wind Power Generation Prediction Based on LSTM," International Conference on Mathematics and Artificial Intelligence, Apr. 2019, pp. 85-89. https://doi.org/10.1145/3325730.3325735.
Zhou et al., "An Online Power Generation Dispatching Method to Improve the Small Signal Stability of Power System with Fluctuated Wind Power," Electrical Power and Computer Engineering, Apr. 2022, pp. 1-12. https://doi.org/10.1145/3529299.3529302.
Zhou et al., "Two-Stage Load Shedding for Secondary Control in Hierarchical Operation of Islanded Microgrids," IEEE Transactions on Smart Grid, May 2019, vol. 10(3), pp. 3103-3111. doi: 10.1109/TSG.2018.2817738.
Appalachian Power Company, SCC Docket Search, PUE-2014-00026, Sep. 5, 2023, Ex. (1025), 4 Pages.
Appalachian Power Company, State Corporation Commission, Commonwealth of Virginia, Nov. 26, 2014, Case No. PUE-2014-00026, Ex. (1019), 51 Pages.
Beltran, H., et al., "Evaluation of Storage Energy Requirements for Constant Production in PV Power Plants," IEEE Transactions on Industrial Electronics, 2012, vol. 60 (3), pp. 1225-1234.
Cho C., et al., "Active synchronizing control of a microgrid", IEEE Transactions on Power Electronics, 2011, vol. 26(12), 13 pages.
Cholla Petitioner's Power of Attorney for U.S. Pat. No. 10,608,433 dated Mar. 31, 2020, 1 page.
Cholla United States District Court for the District of Delaware for U.S. Pat. No. 10,608,433, 1 page.
Decision in Petition for Inter Partes Review dated Mar. 13, 2024 for U.S. Pat. No. 10,608,433, IPR2023-01407, 36 Pages.
Declaration of Andres E. Carvallo mailed Sep. 12, 2023 for U.S. Pat. No. 10,608,433, IPR2023-01407, (Ex. 1003), 103 Pages.
Emergency Demand Response Program Manual, New York ISO, Manual 7, Nov. 2022, Ex. (1010), 50 Pages.
European Patent Application No. 20847753.9, Extended European Search Report dated Jul. 20, 2023.
European Patent Application No. 20847907.1, Extended European Search Report dated Jul. 18, 2023.
European Patent Application No. 20880611.7, Extended European Search Report dated Nov. 3, 2023.
European Patent Application No. 21856804.6, Extended European Search Report dated Mar. 7, 2024.
Final Office Action mailed Feb. 14, 2024 on for U.S. Appl. No. 17/331,440, filed May 26, 2021, 21 pages.
Final Office Action mailed Feb. 15, 2024 for U.S. Appl. No. 17/340,643, filed Jun. 7, 2021, 25 pages.

(56) References Cited

OTHER PUBLICATIONS

Final Office Action mailed Jun. 20, 2023 for U.S. Appl. No. 17/340,643, filed Jun. 7, 2021.
Final Office Action mailed on Jun. 2, 2023 for U.S. Appl. No. 17/513,558, filed Oct. 28, 2021, 15 pages.
Final Office Action mailed on Dec. 6, 2023 for U.S. Appl. No. 17/896,376, filed Aug. 26, 2022, 14 pages.
Final Office Action mailed on Jan. 11, 2024 for U.S. Appl. No. 17/101,784, filed Nov. 23, 2020, 13 pages.
Final Office Action mailed on Oct. 13, 2023 for U.S. Appl. No. 18/066,616, filed Dec. 15, 2023, 10 pages.
Final Office Action mailed on Aug. 4, 2023 for U.S. Appl. No. 17/868,381, filed Jul. 19, 2022, 45 pages.
Gangloff M., "Appalachian Power'sproposed fee targets usersof solar panels," OBM and Cholla Energy, Sep. 8, 2014, Ex. (1017), 3 Pages.
Hua Y., et al., "Building fuel powered supercomputing data center at low cost", Proceedings of the 29th ACM on International Conference on Supercomputing—describes DG systems and associated datacenters, 2015, 10 pages.
Huang Q., et al., "Power Consumption of Virtual Machine Live Migration in Clouds", Third international conference on communications and mobile computing IEEE, 2011, 4 pages.
International Search Report and Written Opinion of PCT Application No. PCT/US2023/22767, mailed on Aug. 4, 2023, 16 pages.
Letter from W. Hix, Indiana Michigan Power, OBM and Cholla Energy, 2014, Ex. (1035), 7 Pages.
Li C., et al., "Enabling distributed generation powered sustainable high-performance data center", 19th International Symposium on High Performance Computer Architecture IEEE, 2013, 12 pages.
Madrigal R., Overview of Reliability Demand Response Resource, OBM and Cholla Energy, May 8, 2014, Ex. (1014), 74 Pages.
Main I., "Virginia energy policy made interesting," Who's afraid of a Carbon Rule?, Power for the People VA, May 2014, Ex. (1018), 10 Pages.
Main I., "Virginia regulators approve Appalachian Power's solar tax", Dec. 1, 2014, Power for the People VA, Ex. (1016), 5 Pages.
Meagher K., et al., "The Enterprise Data Center as a Microgrid", Uptime Institute Symposium describes data centers as a microgrid that capable of operating in islanding mode and grid connected mode, 2010, 8 pages.
Non-Final Office Action mailed Apr. 3, 2024 for U.S. Appl. No. 18/139,134, filed Apr. 25, 2023, 13 Pages.
Non-Final Office Action mailed Nov. 9, 2023 for U.S. Appl. No. 17/340,643, filed Jun. 7, 2021, 21 pages.
Non-Final Office Action mailed Mar. 13, 2024 for U.S. Appl. No. 18/066,616, filed Dec. 15, 2022, 12 pages.
Non-Final Office Action mailed Oct. 13, 2023 for U.S. Appl. No. 18/106,102, filed Feb. 6, 2023, 18 pages.
Non-Final Office Action mailed Jan. 18, 2024 for U.S. Appl. No. 18/139,010, filed Apr. 25, 2023, 12 pages.
Non-Final Office Action mailed Jun. 21, 2023 for U.S. Appl. No. 17/896,376, filed Aug. 26, 2022.
Non-Final Office Action mailed Nov. 21, 2023 for U.S. Appl. No. 17/513,558, filed Oct. 28, 2023, 16 pages.
Non-Final Office Action mailed Jun. 22, 2023 for U.S. Appl. No. 17/101,784, filed Nov. 23, 2020.
Non-Final Office Action mailed Feb. 28, 2024 for U.S. Appl. No. 17/402,175, filed Aug. 13, 2021, 11 pages.
Non-Final Office Action mailed Mar. 29, 2024 for U.S. Appl. No. 18/367,673, filed Sep. 3, 2023, 9 Pages.
Non-Final Office Action mailed Oct. 5, 2023 for U.S. Appl. No. 17/479,750, filed Sep. 20, 2021, 4 pages.
Non-Final Office Action mailed Oct. 5, 2023 for U.S. Appl. No. 18/106,098, filed Feb. 6, 2023, 5 pages.
Non-Final Office Action mailed on Aug. 17, 2023 for U.S. Appl. No. 17/331,440, filed May 26, 2021, 16 pages.
Notice of Allowance mailed on Nov. 3, 2023 for U.S. Appl. No. 18/106,093, filed Feb. 6, 2023, 4 pages.
Notice of Allowance mailed on Dec. 11, 2023 for U.S. Appl. No. 17/868,381, filed Jul. 19, 2022, 10 pages.
Notice of Allowance mailed on Sep. 14, 2023 for U.S. Appl. No. 16/529,360, filed Aug. 1, 2019, 8 pages.
Notice of Allowance mailed on Nov. 22, 2023 for U.S. Appl. No. 18/106,093, filed Feb. 6, 2023, 8 pages.
Notice of Allowance mailed on Jan. 23, 2024 for U.S. Appl. No. 18/114,503, filed Feb. 27, 2023, 5 pages.
Notice of Allowance mailed on Oct. 25, 2023 for U.S. Appl. No. 16/529,360, filed Aug. 1, 2019, 8 pages.
Notice of Allowance mailed on Sep. 29, 2023 for U.S. Appl. No. 18/114,503, filed Feb. 27, 2023, 5 pages.
Notice of Allowance mailed on Aug. 4, 2023 for U.S. Appl. No. 18/106,093, filed Feb. 6, 2023, 8 pages.
Notice of Allowance mailed on Mar. 5, 2024 for U.S. Appl. No. 18/106,102, filed May 2, 2023, 8pages.
Notice of Allowance mailed on Mar. 5, 2024 for U.S. Appl. No. 18/143,280, filed May 4, 2023, 10 pages.
Office of Electricity, "Demand Response," OBM and Cholla Energy, Ex. (1013), 3 Pages.
Patent Owner Preliminary Response to Petition, dated Dec. 20, 2023, Inter Partes Review for U.S. Pat. No. 10,608,433, IPR2023-01407, 71 Pages.
Petition for Inter Partes Review mailed on Sep. 13, 2023 for U.S. Pat. No. 10,608,433, IPR2023-01407, 92 Pages.
Pitt D., et al., "Analyzing the Costs and Benefits of Distributed Solar Generation in Virginia," OBM and Cholla Energy, 2014, Ex. (1022), 70 Pages.
Pitt D., et al., "Assessing the Value of Distributed Solar Energy Generation," Curr Sustainable Renewable Energy, 2015, vol. 2, Ex. (1021) pp. 105-113.
Pitt D., et al., "Optimizing the Grid Integration of Distributed Solar Energy," Final Presidential Research Quest Fund Grant Report Virginia Commonwealth University, OBM and Cholla Energy, Apr. 2018, Ex. (1023), 78 Pages.
PJM, Working to Perfect the Flow of Energy, OBM and Cholla Energy, Manual 11: Energy & Ancillary Services Market Operations, May 11, 2017, 223 Pages.
Politics Bureaucracy and Justice, West Texas A&M University, OBM and Cholla Energy, 2016, vol. 5(1), Ex. 1024, 41 Pages.
Power of Attorney for Petitioner for U.S. Pat. No. 10,608,433 OBM, INC, 3 pages.
Powers J., "Implementation Overview for PDR," OBM and Cholla Energy, Aug. 26, 2014, Ex. (1012), 11 Pages.
Reisinger W T., Public Utilities Law, OBM and Cholla Energy, 2014, Ex. (1020), 33 Pages.
Requirement for Restriction/Election mailed on Dec. 12, 2023 for U.S. Appl. No. 17/402,175, filed Aug. 13, 2021, 5 pages.
Resource Testing Guidelines dated May 18, 2023, Operating Procedure, California ISO, Procedure No. 5330, Ex. (1009), 32 Pages.
The Wayback Machine. SCC Case Information, Public Comments/Notices, 2015, 5, Ex. (1032), 1 Page.
The Wayback Machine. SCC Case Information, Public Comments/Notices, 2015, 5, Ex. (1033), 5 Pages.
Trowler D., et al., "Bi-Directional Inverter and Energy Storage System," Texas Instruments Analog Design Contest, University of Arkansas, May 2008, pp. 1-29.
Virginia S.C .C . Tariff No.—2425 Appalachian Power Company, OBM and Cholla Energy, Jan. 25, 2015, Ex. (1027), 64 Pages.
Virginia S.C .C . Tariff No.—2425 Appalachian Power Company, OBM and Cholla Energy, Jan. 25, 2015, Ex. (1028), 53 Pages.
Virginia S.C .C . Tariff No.—2425 Appalachian Power Company, OBM and Cholla Energy, Jan. 25, 2015, Ex. (1029), 49 Pages.
Virginia S.C .C . Tariff No.—2425 Appalachian Power Company, OBM and Cholla Energy, Jan. 25, 2015, Ex. (1030), 72 Pages.
Virginia S.C .C . Tariff No.—2425 Appalachian Power Company, OBM and Cholla Energy, Jan. 25, 2015, Ex. (1031), 81 Pages.
Virginia S.C .C . Tariff No.—2425 Appalachian Power Company, PUE-2014-00026, Jan. 14, 2014, Ex. (1026), 69 Pages.
Virginia S.C.C. Tarrif No. 2425 Appalachian Power Company dated Jan. 14, 2014, PUE-2014-00026, Ex. (1005), 389 Pages.

(56) References Cited

OTHER PUBLICATIONS

Wang R., et al., "Datacenters as Controllable Load Resources in the Electricity Market," 2013 IEEE 33rd International Conference on Distributed Computing Systems, Ex. (1014), 10 Pages.
Whited M., et al., "The Problem with Fixed Charges for Electricity," Prepared for Consumers Union, Feb. 9, 2016, Ex. (1034), 58 Pages.
Zeeman J., et al., "Emerging Business Models for Local Distribution Companies in Ontario", 2016, 131 pages.

\* cited by examiner

METHOD AND SYSTEM FOR DYNAMIC POWER DELIVERY TO A FLEXIBLE GROWCENTER USING UNUTILIZED ENERGY SOURCES

CROSS-REFERENCE TO RELATED APPLICATIONS

This application is a continuation of U.S. patent application Ser. No. 16/961,386, filed Jul. 10, 2020, which is a U.S. nationalization under 35 U.S.C. § 371 of International Application No. PCT/US2018/017955, filed Feb. 13, 2018, which claims priority from U.S. Provisional Patent Application No. 62/616,348, filed Jan. 11, 2018, the entirety of which are each fully incorporated by reference herein.

BACKGROUND OF THE INVENTION

Rapid population growth threatens to outpace food production, storage, and distribution capabilities. While modern agricultural practices have thus far allowed production to keep pace with population growth, the population is expected to swell to more than nine (9) billion by the year 2050. It is predicted that, by the year 2025, supply will no longer be able to meet demand. This anticipated food shortage is further complicated by the fact that large scale production farms produce the vast majority of food. As such, many regions rely completely on food produced in one location, stored in another, and distributed for local consumption. Storage and distribution logistics further complicate the delivery of fresh food and add additional cost. Thus, new agricultural practices are needed to address these issues as demand starts to outpace supply.

Shipping containers have been adapted for use in farming in non-traditional locations. Containers have successfully been used in traditional agriculture, hydroponics, aquaculture, and aquaponics applications growing food, cash, plantation, and horticulture crops. A single 40-foot container can potentially yield the annual equivalent of three to five acres of farm land. The use of containers offers a number of unique advantages over conventional farming. Container farms are self-contained and modular, thereby allowing them to be built, transported, and situated where local demand exists. In addition, container farms allow farming to take place in locations and climates where farming otherwise wouldn't be viable due to climate, soil conditions, or water availability. Perhaps most importantly, because of their modularity, container farms allow production to scale. Containers may be stacked vertically on top of one another to minimize the footprint and maximize yield.

BRIEF SUMMARY OF THE INVENTION

According to one aspect of one or more embodiments of the present invention, a flexible growcenter includes a mobile container, a behind-the-meter power input system, a power distribution system, a growcenter control system, a climate control system, a lighting system, and an irrigation system. The growcenter control system modulates power delivery to one or more components of the climate control system, the lighting system, and the irrigation system based on unutilized behind-the-meter power availability or an operational directive.

According to one aspect of one or more embodiments of the present invention, a method of dynamic power delivery to a flexible growcenter using unutilized behind-the-meter power includes monitoring unutilized behind-the-meter power availability, determining when a growcenter ramp-up condition is met, and enabling behind-the-meter power delivery to one or more computing systems when the growcenter ramp-up condition is met.

Other aspects of the present invention will be apparent from the following description and claims

DETAILED DESCRIPTION OF THE INVENTION

Figure 1:
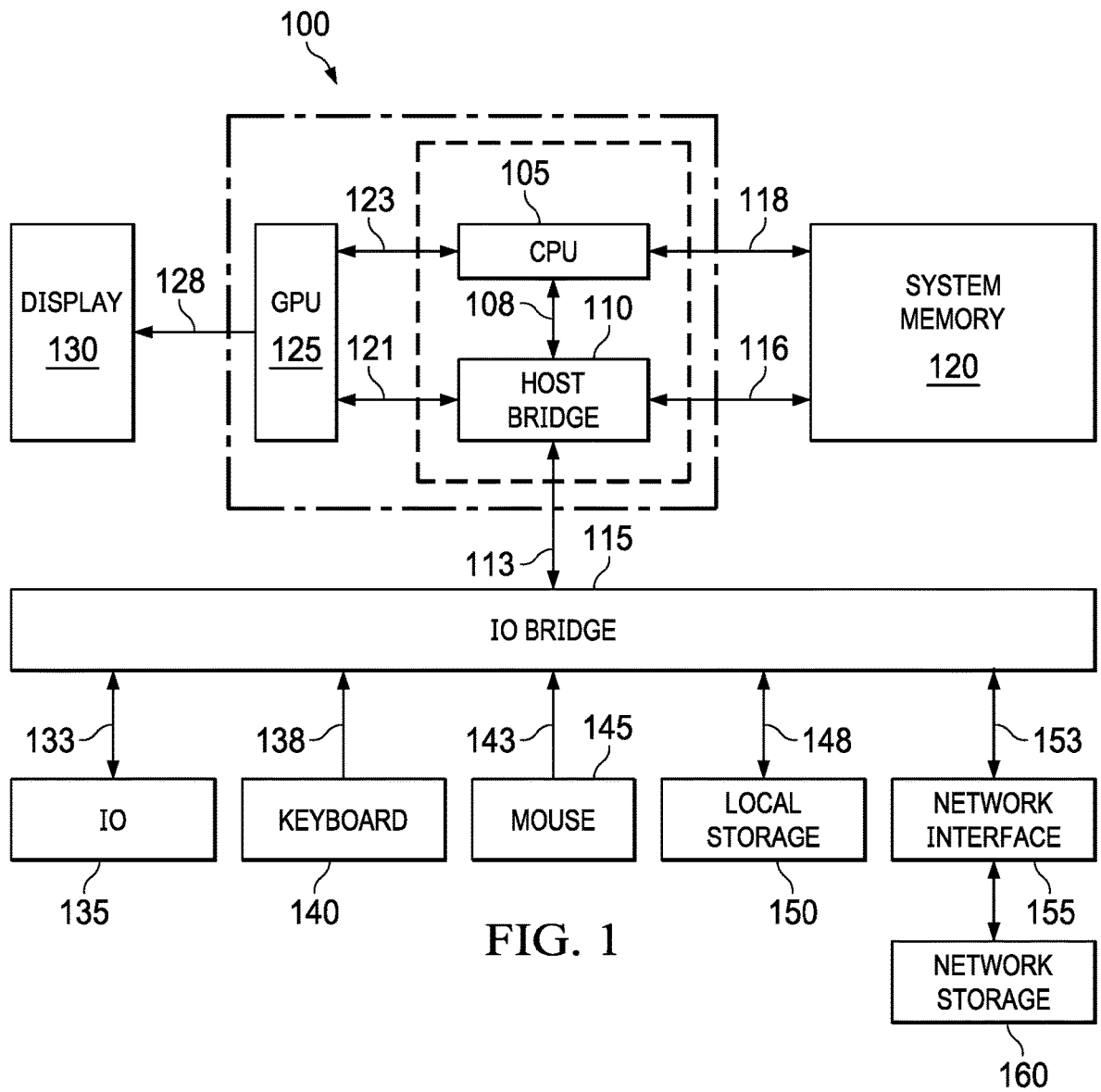
FIG. 1 shows a computing system in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one having ordinary skill in the art are not described to avoid obscuring the description of the present invention.

The modular and scalable nature of container farms provides significant advantage in that they may be located on site near consumption and production may be scaled based on demand. The largest operational cost of a container farm is power. As container farms scale, the power consumption of each container becomes increasingly important. Each container typically includes a climate control system, an irrigation system, and a lighting system, as well as others systems that may be critical to its function, each of which consume power. While advancements have been made to reduce the power consumption of these systems, perhaps most notably, the use of light emitting diode ("LED") lighting systems, the power consumption remains significant and more so as the container farm scales up in size. As such, one of the greatest impediments to the widespread adoption of container farms is the cost prohibitive nature of providing power.

Accordingly, in one or more embodiments of the present invention, a method and system for dynamic power delivery to a flexible growcenter uses unutilized behind-the-meter power sources without transmission and distribution costs. The flexible growcenter may be configured to modulate power delivery to one or more components of the climate control system, an irrigation system, or a lighting system based on the availability of unutilized behind-the-meter power or an operational directive. For example, the flexible growcenter may ramp-up to a fully online status, ramp-down to a fully offline status, or dynamically adjust power consumption, act a load balancer, or adjust the power factor based on which systems, or subsystems thereof, receive power. Advantageously, the flexible growcenter may allow localized farm operations to be performed with little to no energy costs, using clean and renewable energy that would otherwise be wasted.

FIG. 1 shows a computing system 100 in accordance with one or more embodiments of the present invention. Computing system 100 may include one or more central processing units (singular "CPU" or plural "CPUs") 105, host bridge 110, input/output ("IO") bridge 115, graphics processing units (singular "GPU" or plural "GPUs") 125, and/or application-specific integrated circuits (singular "ASIC or plural "ASICs") (not shown) disposed on one or more printed circuit boards (not shown) that are configured to perform computational operations. Each of the one or more CPUs 105, GPUs 125, or ASICs (not shown) may be a single-core (not independently illustrated) device or a multi-core (not independently illustrated) device. Multi-core devices typically include a plurality of cores (not shown) disposed on the same physical die (not shown) or a plurality of cores (not shown) disposed on multiple die (not shown) that are collectively disposed within the same mechanical package (not shown).

CPU 105 may be a general purpose computational device typically configured to execute software instructions. CPU 105 may include an interface 108 to host bridge 110, an interface 118 to system memory 120, and an interface 123 to one or more IO devices, such as, for example, one or more GPUs 125. GPU 125 may serve as a specialized computational device typically configured to perform graphics functions related to frame buffer manipulation. However, one of ordinary skill in the art will recognize that GPU 125 may be used to perform non-graphics related functions that are computationally intensive. In certain embodiments, GPU 125 may interface 123 directly with CPU 125 (and interface 118 with system memory 120 through CPU 105). In other embodiments, GPU 125 may interface 121 with host bridge 110 (and interface 116 or 118 with system memory 120 through host bridge 110 or CPU 105 depending on the application or design). In still other embodiments, GPU 125 may interface 133 with 10 bridge 115 (and interface 116 or 118 with system memory 120 through host bridge 110 or CPU 105 depending on the application or design). The functionality of GPU 125 may be integrated, in whole or in part, with CPU 105.

Host bridge 110 may be an interface device configured to interface between the one or more computational devices and IO bridge 115 and, in some embodiments, system memory 120. Host bridge 110 may include an interface 108 to CPU 105, an interface 113 to IO bridge 115, for embodiments where CPU 105 does not include an interface 118 to system memory 120, an interface 116 to system memory 120, and for embodiments where CPU 105 does not include an integrated GPU 125 or an interface 123 to GPU 125, an interface 121 to GPU 125. The functionality of host bridge 110 may be integrated, in whole or in part, with CPU 105. IO bridge 115 may be an interface device configured to interface between the one or more computational devices and various IO devices (e.g., 140, 145) and IO expansion, or add-on, devices (not independently illustrated). IO bridge 115 may include an interface 113 to host bridge 110, one or more interfaces 133 to one or more IO expansion devices 135, an interface 138 to keyboard 140, an interface 143 to mouse 145, an interface 148 to one or more local storage devices 150, and an interface 153 to one or more network interface devices 155. The functionality of IO bridge 115 may be integrated, in whole or in part, with CPU 105 or host bridge 110. Each local storage device 150, if any, may be a solid-state memory device, a solid-state memory device array, a hard disk drive, a hard disk drive array, or any other non-transitory computer readable medium. Network interface device 155 may provide one or more network interfaces including any network protocol suitable to facilitate networked communications.

Computing system 100 may include one or more network-attached storage devices 160 in addition to, or instead of, one or more local storage devices 150. Each network-attached storage device 160, if any, may be a solid-state memory device, a solid-state memory device array, a hard disk drive, a hard disk drive array, or any other non-transitory computer readable medium. Network-attached storage device 160 may or may not be collocated with computing system 100 and may be accessible to computing system 100 via one or more network interfaces provided by one or more network interface devices 155.

One of ordinary skill in the art will recognize that computing system 100 may be a conventional computing system or an application-specific computing system. In certain embodiments, an application-specific computing system may include one or more ASICs (not shown) that are configured to perform one or more functions in a more efficient manner. The one or more ASICs (not shown) may interface directly with CPU 105, host bridge 110, or GPU 125 or interface through IO bridge 115. Alternatively, in other embodiments, an application-specific computing system may be reduced to only those components necessary to perform a desired function in an effort to reduce one or more of chip count, printed circuit board footprint, thermal design power, and power consumption. The one or more ASICs (not shown) may be used instead of one or more of CPU 105, host bridge 110, IO bridge 115, or GPU 125. In such systems, the one or more ASICs may incorporate sufficient functionality to perform certain network and computational functions in a minimal footprint with substantially fewer component devices.

As such, one of ordinary skill in the art will recognize that CPU 105, host bridge 110, IO bridge 115, GPU 125, or ASIC (not shown) or a subset, superset, or combination of functions or features thereof, may be integrated, distributed, or excluded, in whole or in part, based on an application, design, or form factor in accordance with one or more embodiments of the present invention. Thus, the description of computing system 100 is merely exemplary and not intended to limit the type, kind, or configuration of component devices that constitute a computing system 100 suitable for performing computing operations in accordance with one or more embodiments of the present invention.

One of ordinary skill in the art will recognize that computing system 100 may be a stand alone, laptop, desktop, server, blade, or rack mountable system and may vary based on an application or design.

Figure 2:
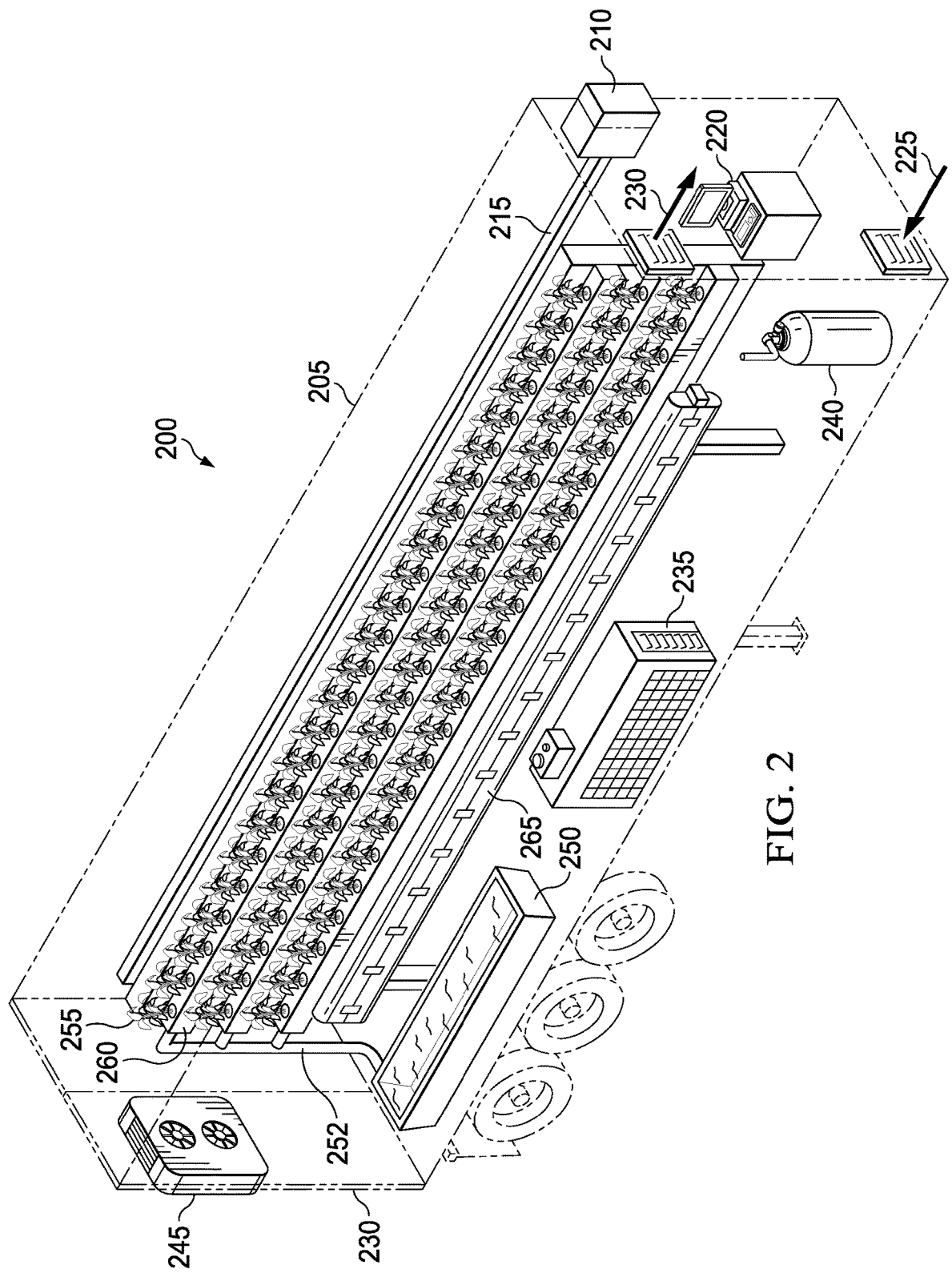
FIG. 2 shows a flexible growcenter in accordance with one or more embodiments of the present invention.

FIG. 2 shows a flexible growcenter 200 in accordance with one or more embodiments of the present invention. Flexible growcenter 200 may include a mobile container 205, a behind-the-meter power input system 210, a power distribution system 215, a growcenter control system 220, a climate control system (e.g., 225, 230, 235, 240, and/or 245), an irrigation system (e.g., 250 and 252), a plurality of plants 255 disposed in a plurality of grow containers 260, and a lighting system 265.

Growcenter control system 220 may be a computing system (e.g., 100 of FIG. 1) configured to dynamically modulate power delivery to one or more components of the climate control system (e.g., 235, 240, and/or 245), the irrigation system (e.g., 252), and lighting system 265 disposed within flexible growcenter 200 based on unutilized behind-the-meter power availability or an operational directive from a local station control system (not shown), a remote master control system (not shown), or a grid operator (not shown).

In certain embodiments, mobile container 205 may be a storage trailer disposed on wheels and configured for rapid deployment. In other embodiments, mobile container 205 may be a storage container (not shown) configured for placement on the ground and potentially stacked in a vertical manner (not shown). In still other embodiments, mobile container 205 may be an inflatable container, a floating container, or any other type or kind of container suitable for housing a mobile growcenter 200.

Flexible growcenter 200 may be rapidly deployed on site near a source of unutilized behind-the-meter power generation. Behind-the-meter power input system 210 may be configured to input power to flexible growcenter 200. Behind-the-meter power input system 210 may include a first input (not independently illustrated) configured to receive three-phase behind-the-meter alternating current ("AC") voltage. In certain embodiments, behind-the-meter power input system 210 may include a supervisory AC-to-AC step-down transformer (not shown) configured to step down three-phase behind-the-meter AC voltage to single-phase supervisory nominal AC voltage or a second input (not independently illustrated) configured to receive single-phase supervisory nominal AC voltage from the local station (not shown) or a metered source (not shown). Behind-the-meter power input system 210 may provide single-phase supervisory nominal AC voltage to growcenter control system 220, which may remain powered at almost all times to control the operation of flexible growcenter 200. The first input (not independently illustrated) or a third input (not independently illustrated) of behind-the-meter power input system 210 may direct three-phase behind-the-meter AC voltage to an operational AC-to-AC step-down transformer (not shown) configured to controllably step down three-phase behind-the-meter AC voltage to three-phase nominal AC voltage. Growcenter control system 220 may controllably enable or disable generation or provision of three-phase nominal AC voltage by the operational AC-to-AC step-down transformer (not shown).

Behind-the-meter power input system 210 may provide three phases of three-phase nominal AC voltage to power distribution system 215. Power distribution system 215 may controllably provide a single phase of three-phase nominal AC voltage to components of the climate control system (e.g., 235, 240, and/or 245), the irrigation system (e.g., 252), and subsets of lights (not independently illustrated) of lighting system 265 disposed within flexible growcenter 200. Growcenter control system 220 may controllably select which phase of three-phase nominal AC voltage that power distribution system 215 provides to components of the climate control system (e.g., 235, 240, and/or 245), the irrigation system (e.g., 252), and one or more lights (not independently illustrated) of lighting system 265. In this way, growcenter control system 220 may modulate power delivery by either ramping-up flexible growcenter 200 to fully operational status, ramping-down flexible growcenter 200 to offline status (where only growcenter control system 220 remains powered), reducing power consumption by withdrawing power delivery from, or reducing power to, one or more components of the climate control system (e.g., 235, 240, and/or 245), the irrigation system (e.g., 252), and lights (not independently illustrated) of lighting system 265, or modulating a power factor correction factor for the local station by controllably adjusting which phases of three-phase nominal AC voltage are used by one or more components of the climate control system (e.g., 235, 240, and/or 245), the irrigation system (e.g., 252), and lights (not independently illustrated) of lighting system 265.

Flexible growcenter 200 may include a climate control system (e.g., 225, 230, 235, 240, and/or 245) configured to maintain the climate within container 205. In certain embodiments, the climate control system may include an air intake 225, an air outtake 230, a humidity control system 235, a gas system 240, and an air conditioner/heater 245, each of which may be independently powered, with a single phase of three-phase nominal AC voltage for maximum flexibility. Humidity control system 235 may, under the direction of growcenter computing system 220 or based on one or more sensors (not independently illustrated), regulate the relative humidity within container 205 to control the transpiration of the plants 255. Gas system 240 may, under the direction of growcenter computing system 220 or based on one or more sensors (not independently illustrated), regulate the release of one or more gases, such as, for example, carbon dioxide, $CO_2$, that, with light and nutrients, aid the plants 255 in photosynthesis. Air conditioner/heater 245 may be used to control the temperature within container 205. The enclosure of container 205, as well as the use of heat generating lights 265, tends to increase the ambient temperature within container 205, which damages plants 255. In warm climates, air conditioner 245 may be configured to lower the temperature within container 205 to a temperature suitable for growth of the plants 255. In cold climates, heater 245 may be configured to raise the temperature within container 205 to a temperature suitable for growth of the plants 255.

The irrigation system may include a water tank 250, a pump system (not independently illustrated), and a plurality of irrigation lines 252 that provide water to plants 255. The pump system (not independently illustrated) may be powered by a single phase of three-phase nominal AC voltage. Lighting system 265 may include a plurality of lights (not independently illustrated) that provide light for photosynthesis. Each light (not independently illustrated) or group of lights (not independently illustrated) of lighting system 265 may be powered by a single phase of three-phase nominal AC voltage. Lighting system 265 may, under direction of growcenter computing system 220, control the on or off state of one or more lights (not independently illustrated) or groups of lights (not independently illustrated) of lighting system 265. The lights (not independently illustrated) may be fluorescent, high intensity discharge ("HID"), or LED lights. Because the lighting system 265 tends to work antagonistically with the climate control system (e.g., 225, 230, 235, 240, and/or 245), the modern trend is to use LED lights. However, one of ordinary skill in the art will recognize that the type of lights used may vary based on an application or design.

Flexible growcenter 200 may include a battery system (not shown) configured to convert three-phase nominal AC voltage to nominal DC voltage and store power in a plurality of storage cells. The battery system (not shown) may include a DC-to-AC inverter configured to convert nominal DC voltage to three-phase nominal AC voltage for flexible growcenter 200 use. Alternatively, the battery system (not shown) may include a DC-to-AC inverter configured to convert nominal DC voltage to single-phase nominal AC voltage to power growcenter control system 220.

One of ordinary skill in the art will recognize that a voltage level of three-phase behind-the-meter AC voltage may vary based on an application or design and the type or kind of local power generation. As such, a type, kind, or configuration of the operational AC-to-AC step down transformer (not shown) may vary based on the application or design. In addition, the frequency and voltage level of three-phase nominal AC voltage, single-phase nominal AC voltage, and nominal DC voltage may vary based on the application or design in accordance with one or more embodiments of the present invention.

Figure 3:
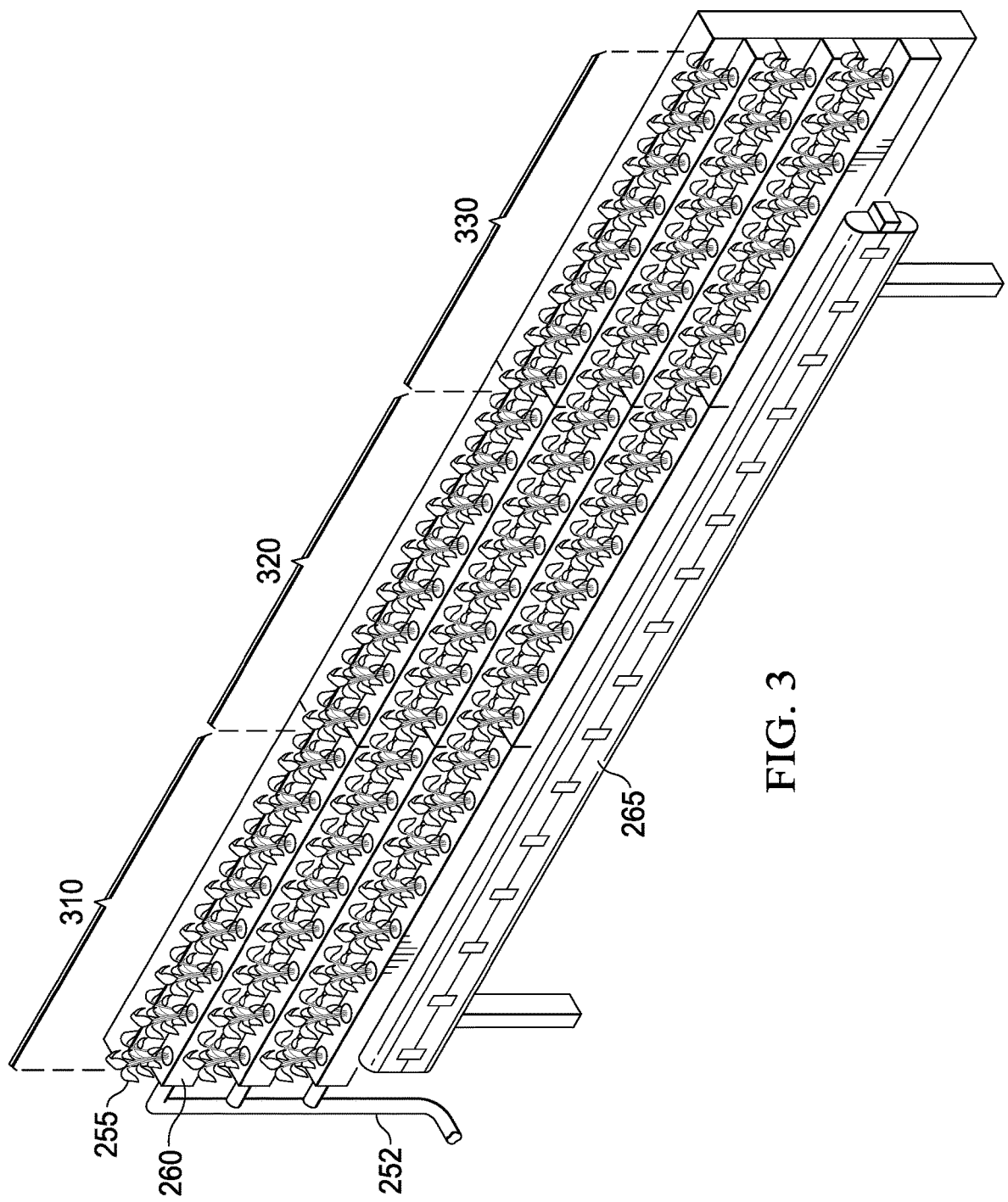
FIG. 3 shows a three-phase power distribution of a flexible growcenter in accordance with one or more embodiments of the present invention.

FIG. 3 shows a three-phase power distribution of a flexible growcenter 200 in accordance with one or more embodiments of the present invention. Flexible growcenter 200 may include a plurality of plants 255 disposed within a plurality of containers 260. As discussed above, the behind-the-meter power input system (210 of FIG. 2) may provide three phases of three-phase nominal AC voltage to the power distribution system (215 of FIG. 2). The power distribution system (215 of FIG. 2) may controllably provide a single phase of three-phase nominal AC voltage to one or more components of the climate control system (e.g., 235, 240, and/or 245), the pump system (e.g., pump for 252) that drives water through the irrigation lines 252 of the irrigation system to one or more plants 255, and one or more lights (not independently illustrated) of the lighting system 265 disposed within flexible growcenter 200. For example, for purposes of illustration only, a flexible growcenter 200 may include three groups (e.g., 310, 320, and 330) of plants 255, each of which may have one or more independently controlled lights (not independently illustrated) of the lighting system 265 and the pump system (not independently illustrated) that drives one or more irrigation lines 252. The power distribution system (215 of FIG. 2) may control which phase of three-phase nominal AC voltage is provided to the one or more lights (not independently illustrated) of the lighting system 265 and the pump system (not independently illustrated) that drives one or more irrigation lines 252

In the figure, for purposes of illustration only, the plurality of plants 255 disposed in the plurality of containers 260 may be divided into a first group 310, a second group 320, and a third group 330, where each group includes a subset of lights (not independently illustrated) of lighting system 265, and potentially other components such as, for example, the pumping system (not independently illustrated) that drives one or more irrigation lines 252. The power distribution system (215 of FIG. 2) may, for example, provide a first phase of three-phase nominal AC voltage to the first group 310, a second phase of three-phase nominal AC voltage to the second group 320, and a third phase of three-phase nominal AC voltage to the third group 330. If the flexible growcenter (200 of FIG. 2) receives an operational directive from the local station (not shown) to provide power factor correction, the growcenter control system (220 of FIG. 2) may direct the power distribution system (215 of FIG. 2) to adjust which phase or phases of three-phase nominal AC voltage are used to provide the power factor correction required by the local station (not shown) or grid operator (not shown). One of ordinary skill in the art will recognize that, in addition to the power distribution, the load may be varied by adjusting the number of groups operatively powered. As such, the flexible growcenter (200 of FIG. 2) may be configured to act as a capacitive or inductive load to provide the appropriate reactance necessary to achieve the power factor correction required by the local station (not shown).

Figure 4:
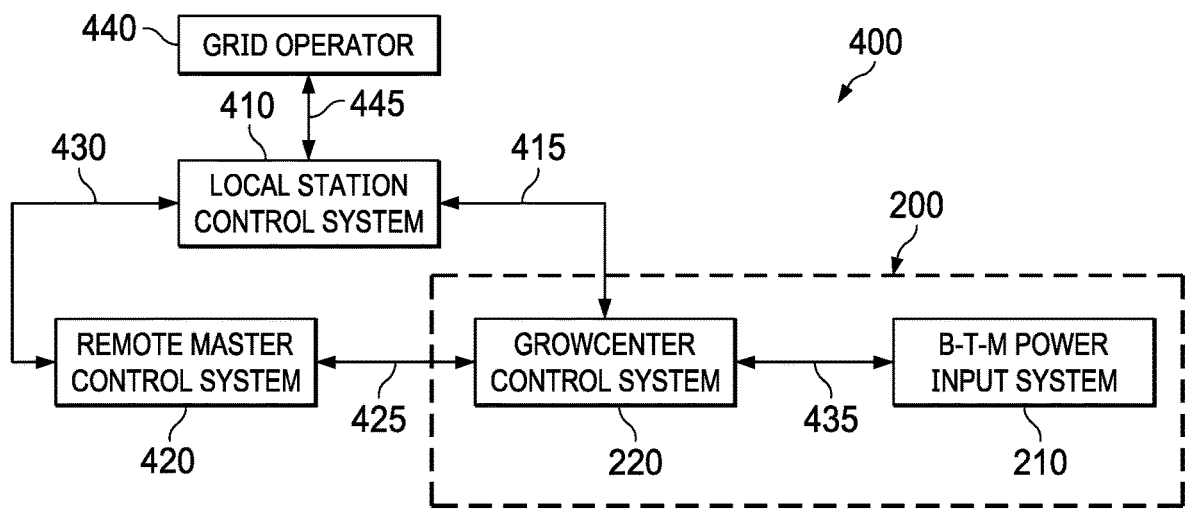
FIG. 4 shows a control distribution scheme of a flexible growcenter in accordance with one or more embodiments of the present invention.

FIG. 4 shows a control distribution scheme of a flexible growcenter 200 in accordance with one or more embodiments of the present invention. Growcenter control system 220 may independently, or cooperatively with one or more of local station control system 410, remote master control system 420, and grid operator 440, modulate power delivery to flexible growcenter 200. Specifically, power delivery may be dynamically adjusted based on conditions or operational directives.

Local station control system 410 may be a computing system (e.g., 100 of FIG. 1) that is configured to control various aspects of the local station (not independently illustrated) that generates power and sometimes generates unutilized behind-the-meter power. Local station control system 410 may communicate with remote master control system 420 over a networked connection 430 and with growcenter control system 220 over a networked or hardwired connection 415. Remote master control system 420 may be a computing system (e.g., 100 of FIG. 1) that is located offsite, but connected via a network connection 425 to growcenter control system 220, that is configured to provide supervisory or override control of flexible growcenter 200 or a fleet (not shown) of flexible growcenters 200. Grid operator 440 may be a computing system (e.g., 100 of FIG. 1) that is configured to control various aspects of the grid (not independently illustrated) that receives power from the local station (not independently illustrated). Grid operator 440 may communicate with local station control system 440 over a networked or hardwired connection 445.

Growcenter control system 220 may monitor unutilized behind-the-meter power availability at the local station (not independently illustrated) and determine when a growcenter ramp-up condition is met. Unutilized behind-the-meter power availability may include one or more of excess local power generation, excess local power generation that the grid cannot accept, local power generation that is subject to economic curtailment, local power generation that is subject to reliability curtailment, local power generation that is subject to power factor correction, situations where local power generation is prohibitively low, start up situations, transient situations, or testing situations where there is an economic advantage to using locally generated behind-the-meter power generation, specifically power available at little to no cost and with no associated transmission or distribution costs.

The growcenter ramp-up condition may be met if there is sufficient behind-the-meter power availability and there is no operational directive from local station control system 410, remote master control system 420, or grid operator 440 to go offline or reduce power. As such, growcenter control system 220 may enable 435 behind-the-meter power input system 210 to provide three-phase nominal AC voltage to the power distribution system (215 of FIG. 2) to power one or more components of the climate control system (e.g., 235, 240, and/or 245), the irrigation system (e.g., 252), and lighting system 265 or a subset thereof.

Remote master control system 420 may specify to growcenter control system 220 what sufficient behind-the-meter power availability constitutes, or growcenter control system 220 may be programmed with a predetermined preference or criteria on which to make the determination independently. For example, in certain circumstances, sufficient behind-the-meter power availability may be less than that required to fully power the entire flexible growcenter 200. In such circumstances, growcenter control system 220 may provide power to only a subset of one or more components of the climate control system (e.g., 235, 240, and/or 245), the irrigation system (e.g., 252), and lighting system 265, that is within the sufficient, but less than full, range of power that is available.

While flexible growcenter 200 is online and operational, a growcenter ramp-down condition may be met when there is insufficient, or anticipated to be insufficient, behind-the-meter power availability or there is an operational directive from local station control system 410, remote master control system 420, or grid operator 440. Growcenter control system 220 may monitor and determine when there is insufficient, or anticipated to be insufficient, behind-the-meter power availability. As noted above, sufficiency may be specified by remote master control system 420 or growcenter control system 220 may be programmed with a predetermined preference or criteria on which to make the determination independently. An operational directive may be based on current dispatchability, forward looking forecasts for when unutilized behind-the-meter power is, or is expected to be, available, economic considerations, reliability considerations, operational considerations, or the discretion of the local station 410, remote master control 420, or grid operator 440. For example, local station control system 410, remote master control system 420, or grid operator 440 may issue an operational directive to flexible growcenter 200 to go offline and power down. When the growcenter ramp-down condition is met, growcenter control system 220 may disable power delivery to one or more components of the climate control system (e.g., 235, 240, and/or 245), the irrigation system (e.g., 252), and lighting system 265. Growcenter control system 220 may disable 435 behind-the-meter power input system 210 from providing three-phase nominal AC voltage to the power distribution system (215 of FIG. 2) to power down the one or more components of the climate control system (e.g., 235, 240, and/or 245), the irrigation system (e.g., 252), and lighting system 265, while growcenter control system 220 remains powered and is capable of rebooting flexible growcenter 200 when unutilized behind-the-meter power becomes available again.

While flexible growcenter 200 is online and operational, changed conditions or an operational directive may cause growcenter control system 220 to modulate power consumption by flexible growcenter 200. Growcenter control system 220 may determine, or local station control system 410, remote master control system 420, or grid operator 440 may communicate, that a change in local conditions may result in less power generation, availability, or economic feasibility, than would be necessary to fully power flexible growcenter 200. In such situations, growcenter control system 220 may take steps to reduce or stop power consumption by flexible growcenter 200 (other than that required to maintain operation of growcenter control system 220). Alternatively, local station control system 410, remote master control system 420, or grid operator 440, may issue an operational directive to reduce power consumption for any reason, the cause of which may be unknown. In response, growcenter control system 220 may dynamically reduce or withdraw power delivery to one or more components of the climate control system (e.g., 235, 240, and/or 245), the irrigation system (e.g., 252), and lighting system 265 to meet the dictate. Growcenter control system 220 may controllably provide three-phase nominal AC voltage to a smaller subset of one or more components of the climate control system (e.g., 235, 240, and/or 245), the irrigation system (e.g., 252), and lighting system 265 to reduce power consumption.

Figure 5:
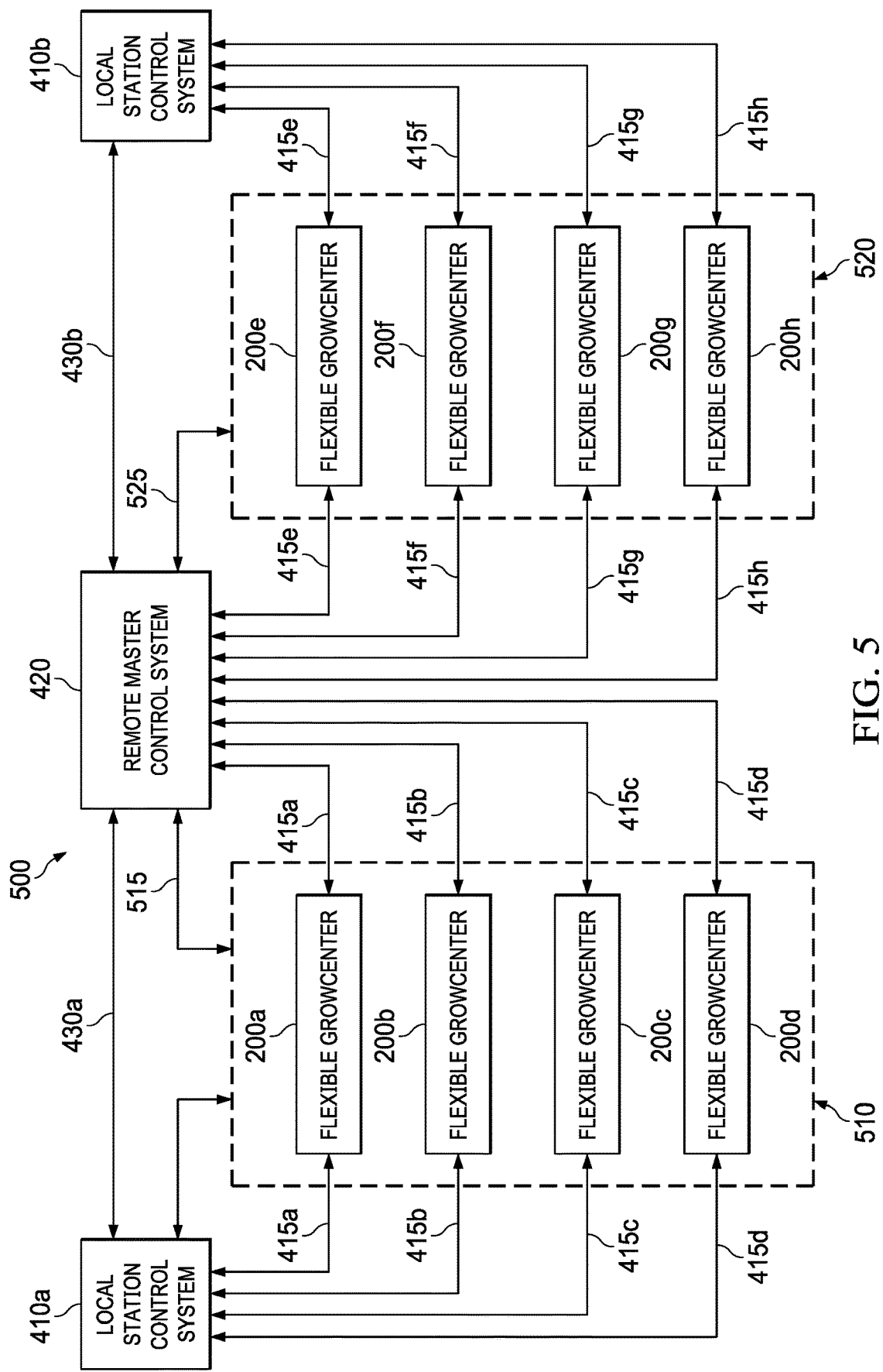
FIG. 5 shows a control distribution scheme of a fleet of flexible growcenters in accordance with one or more embodiments of the present invention

FIG. 5 shows a control distribution of a fleet 500 of flexible growcenters 200 in accordance with one or more embodiments of the present invention. The control distribution of a flexible growcenter 200 shown and described with respect to FIG. 4 may be extended to a fleet 500 of flexible growcenters 200. For example, a first local station (not independently illustrated), such as, for example, a wind farm (not shown), may include a first plurality 510 of flexible growcenters 200a through 200d, which may be collocated or distributed across the local station (not shown). A second local station (not independently illustrated), such as, for example, another wind farm or a solar farm (not shown), may include a second plurality 520 of flexible growcenters 200e through 200h which may be collocated or distributed across the local station (not shown). One of ordinary skill in the art will recognize that the number of flexible growcenters 200 deployed at a given station and the number of stations within the fleet 500 may vary based on an application or design in accordance with one or more embodiments of the present invention.

Remote master control system 420 may provide supervisory control over fleet 500 of flexible growcenters 200 in a similar manner to that shown and described with respect to FIG. 4, with the added flexibility to make high level decisions with respect to fleet 500 that may be counterintuitive to a given station. Remote master control system 420 may make decisions regarding the issuance of operational directives to a given local station based on, for example, the status of each local station where flexible growcenters 200 are deployed.

Figure 6:
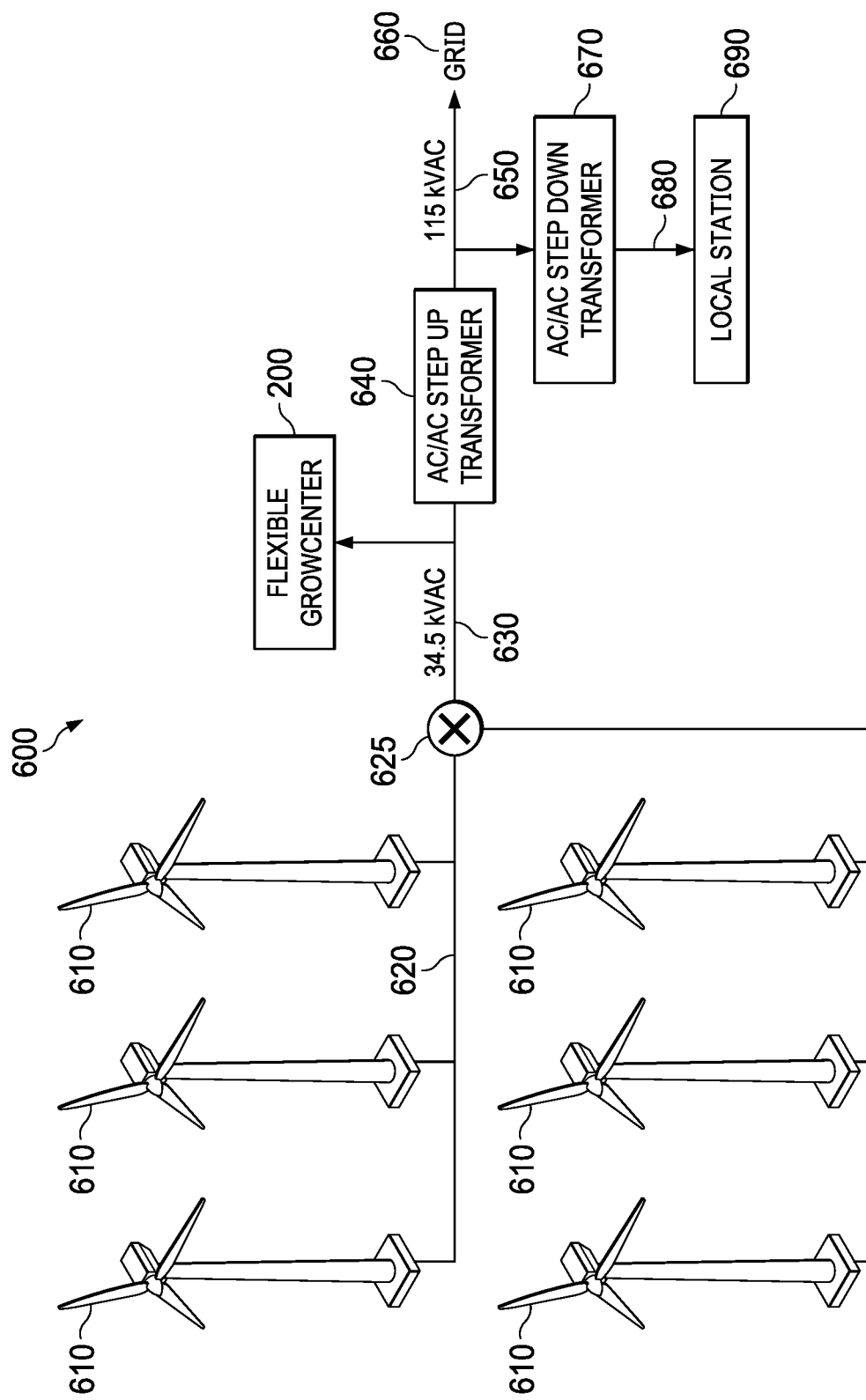
FIG. 6 shows a flexible growcenter powered by one or more wind turbines in accordance with one or more embodiments of the present invention.

FIG. 6 shows a flexible growcenter 200 powered by one or more wind turbines 610 in accordance with one or more embodiments of the present invention. A wind farm 600 typically includes a plurality of wind turbines 610, each of which intermittently generates a wind-generated AC voltage. The wind-generated AC voltage may vary based on a type, kind, or configuration of farm 600, turbine 610, and incident wind speed. The wind-generated AC voltage is typically input into a turbine AC-to-AC step-up transformer (not shown) that is disposed within the nacelle (not independently illustrated) or at the base of the mast (not independently illustrated) of turbine 610. The turbine AC-to-AC step up transformer (not shown) outputs three-phase wind-generated AC voltage 620. Three-phase wind-generated AC voltage 620 produced by the plurality of wind turbines 610 is collected 625 and provided 630 to another AC-to-AC step-up transformer 640 that steps up three-phase wind-generated AC voltage 620 to three-phase grid AC voltage 650 suitable for delivery to grid 660. Three-phase grid AC voltage 650 may be stepped down with an AC-to-AC step-down transformer 670 configured to produce three-phase local station AC voltage 680 provided to local station 690. One of ordinary skill in the art will recognize that the actual voltage levels may vary based on the type, kind, or number of wind turbines 610, the configuration or design of wind farm 600, and grid 660 that it feeds into.

The output side of AC-to-AC step-up transformer 640 that connects to grid 660 may be metered and is typically subject to transmission and distribution costs. In contrast, power consumed on the input side of AC-to-AC step-up transformer 640 may be considered behind-the-meter and is typically not subject to transmission and distribution costs. As such, one or more flexible growcenters 200 may be powered by three-phase wind-generated AC voltage 620. Specifically, in wind farm 600 applications, the three-phase behind-the-meter AC voltage used to power flexible growcenter 200 may be three-phase wind-generated AC voltage 620. As such, flexible growcenter 200 may reside behind-the-meter, avoid transmission and distribution costs, and may be dynamically powered when unutilized behind-the-meter power is available.

Unutilized behind-the-meter power availability may occur when there is excess local power generation. In high wind conditions, wind farm 600 may generate more power than, for example, AC-to-AC step-up transformer 640 is rated for. In such situations, wind farm 600 may have to take steps to protect its equipment from damage, which may include taking one or more turbines 610 offline or shunting their voltage to dummy loads or ground. Advantageously, one or more flexible growcenters 200 may be used to consume power on the input side of AC-to-AC step-up transformer 640, thereby allowing wind farm 600 to operate equipment within operating ranges while flexible growcenter 200 receives behind-the-meter power without transmission or distribution costs. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote mater control system (420 of FIG. 4) may determine how to power each individual flexible growcenter 200 in accordance with the operational directive or provide an override to each flexible growcenter 200.

Another example of unutilized behind-the-meter power availability is when grid 660 cannot, for whatever reason, take the power being produced by wind farm 600. In such situations, wind farm 600 may have to take one or more turbines 610 offline or shunt their voltage to dummy loads or ground. Advantageously, one or more flexible growcenters 200 may be used to consume power on the input side of AC-to-AC step-up transformer 640, thereby allowing wind farm 600 to either produce power to grid 660 at a lower level or shut down transformer 640 entirely while flexible growcenter 200 receives behind-the-meter power without transmission or distribution costs. The local station control system (not independently illustrated) of local station 690 or the grid operator (not independently illustrated) of grid 660 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is selling power to grid 660 at a negative price that is offset by a production tax credit. In certain circumstances, the value of the production tax credit may exceed the price wind farm 600 would have to pay to grid 660 to offload their generated power. Advantageously, one or more flexible growcenters 200 may be used to consume power behind-the-meter, thereby allowing wind farm 600 to produce and obtain the production tax credit, but sell less power to grid 660 at the negative price. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenter 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is selling power to grid 660 at a negative price because grid 660 is oversupplied or is instructed to stand down and stop producing altogether. The grid operator (not independently illustrated) may select certain power generation stations to go offline and stop producing power to grid 660. Advantageously, one or more flexible growcenters 200 may be used to consume power behind-the-meter, thereby allowing wind farm 600 to stop producing power to grid 660, but making productive use of the power generated behind-the-meter without transmission or distribution costs. The local station control system (not independently illustrated) of the local station 690 or the grid operator (not independently illustrated) of grid 660 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when wind farm 600 is producing power to grid 660 that is unstable, out of phase, or at the wrong frequency, or grid 660 is already unstable, out of phase, or at the wrong frequency for whatever reason. The grid operator (not independently illustrated) may select certain power generation stations to go offline and stop producing power to grid 660. Advantageously, one or more flexible growcenters 200 may be used to consume power behind-the-meter, thereby allowing wind farm 600 to stop producing power to grid 660, but make productive use of the power generated behind-the-meter without transmission or distribution costs. The local station control system (not independently illustrated) of local station 690 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Further examples of unutilized behind-the-meter power availability is when wind farm 600 experiences low wind conditions that make it not economically feasible to power up certain components, such as, for example, the local station (not independently illustrated), but there may be sufficient behind-the-meter power availability to power one or more flexible growcenters 200. Similarly, unutilized behind-the-meter power availability may occur when wind farm 600 is starting up, or testing, one or more turbines 610. Turbines 610 are frequently offline for installation, maintenance, and service and must be tested prior to coming online as part of the array. One or more flexible growcenters 200 may be powered by one or more turbines 610 that are offline from farm 600. The above-noted examples of when unutilized behind-the-meter power is available are merely exemplary and are not intended to limit the scope of what one of ordinary skill in the art would recognize as unutilized behind-the-meter power availability. Unutilized behind-the-meter power availability may occur anytime there is power available and accessible behind-the-meter that is not subject to transmission and distribution costs and there is an economic advantage to using it.

One of ordinary skill in the art will recognize that wind farm 600 and wind turbine 610 may vary based on an application or design in accordance with one or more embodiments of the present invention.

Figure 7:
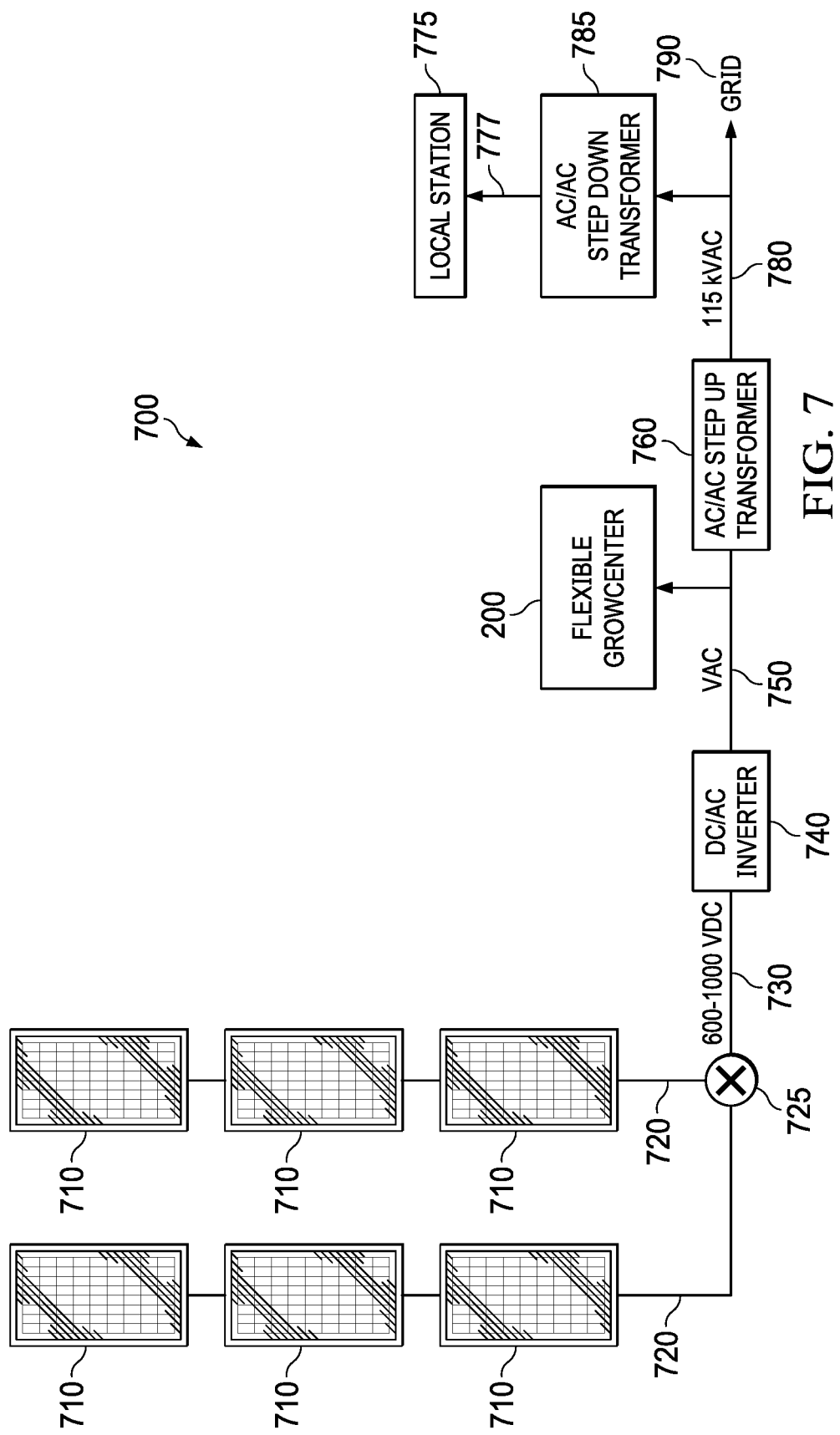
FIG. 7 shows a flexible growcenter powered by one or more solar panels in accordance with one or more embodiments of the present invention.

FIG. 7 shows a flexible growcenter 200 powered by one or more solar panels 710 in accordance with one or more embodiments of the present invention. A solar farm 700 typically includes a plurality of solar panels 710, each of which intermittently generates a solar-generated DC voltage 720. Solar-generated DC voltage 720 may vary based on a type, kind, or configuration of farm 700, panel 710, and incident sunlight. Solar-generated DC voltage 720 produced by the plurality of solar panels 710 is collected 725 and provided 730 to a DC-to-AC inverter that converts solar-generated DC voltage into three-phase solar-generated AC voltage 750 Three-phase solar-generated AC voltage 750 is provided to an AC-to-AC step-up transformer 760 that steps up three-phase solar-generated AC voltage to three-phase grid AC voltage 790. Three-phase grid AC voltage 790 may be stepped down with an AC-to-AC step-down transformer 785 configured to produce three-phase local station AC voltage 777 provided to local station 775. One of ordinary skill in the art will recognize that the actual voltage levels may vary based on the type, kind, or number of solar panels 710, the configuration or design of solar farm 700, and grid 790 that it feeds into.

The output side of AC-to-AC step-up transformer 760 that connects to grid 790 may be metered and is typically subject to transmission and distribution costs. In contrast, power consumed on the input side of AC-to-AC step-up transformer 760 may be considered behind-the-meter and is typically not subject to transmission and distribution costs. As such, one or more flexible growcenters 200 may be powered by three-phase solar-generated AC voltage 750. Specifically, in solar farm 700 applications, the three-phase behind-the-meter AC voltage used to power flexible growcenter 200 may be three-phase solar-generated AC voltage 750. As such, flexible growcenter 200 may reside behind-the-meter, avoid transmission and distribution costs, and may be dynamically powered when unutilized behind-the-meter power is available.

Unutilized behind-the-meter power availability may occur when there is excess local power generation. In high incident sunlight situations, solar farm 700 may generate more power than, for example, AC-to-AC step-up transformer 760 is rated for. In such situations, solar farm 700 may have to take steps to protect its equipment from damage, which may include taking one or more panels 710 offline or shunting their voltage to dummy loads or ground. Advantageously, one or more flexible growcenters 200 may be used to consume power on the input side of AC-to-AC step-up transformer 760, thereby allowing solar farm 700 to operate equipment within operating ranges while flexible growcenter 200 receives behind-the-meter power without transmission or distribution costs. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote mater control system (420 of FIG. 4) may determine how to power each individual flexible growcenter 200 in accordance with the operational directive or provide an override to each flexible growcenter 200.

Another example of unutilized behind-the-meter power availability is when grid 790 cannot, for whatever reason, take the power being produced by solar farm 700. In such situations, solar farm 700 may have to take one or more panels 710 offline or shunt their voltage to dummy loads or ground. Advantageously, one or more flexible growcenters 200 may be used to consume power on the input side of AC-to-AC step-up transformer 760, thereby allowing solar farm 700 to either produce power to grid 790 at a lower level or shut down transformer 760 entirely while flexible growcenter 200 receives behind-the-meter power without transmission or distribution costs. The local station control system (not independently illustrated) of local station 775 or the grid operator (not independently illustrated) of grid 790 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is selling power to grid 790 at a negative price that is offset by a production tax credit. In certain circumstances, the value of the production tax credit may exceed the price solar farm 700 would have to pay to grid 790 to offload their generated power. Advantageously, one or more flexible growcenters 200 may be used to consume power behind-the-meter, thereby allowing solar farm 700 to produce and obtain the production tax credit, but sell less power to grid 790 at the negative price. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenter 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is selling power to grid 790 at a negative price because grid 790 is oversupplied or is instructed to stand down and stop producing altogether. The grid operator (not independently illustrated) may select certain power generation stations to go offline and stop producing power to grid 790. Advantageously, one or more flexible growcenters 200 may be used to consume power behind-the-meter, thereby allowing solar farm 700 to stop producing power to grid 790, but making productive use of the power generated behind-the-meter without transmission or distribution costs. The local station control system (not independently illustrated) of the local station 775 or the grid operator (not independently illustrated) of grid 790 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Another example of unutilized behind-the-meter power availability is when solar farm 700 is producing power to grid 790 that is unstable, out of phase, or at the wrong frequency, or grid 790 is already unstable, out of phase, or at the wrong frequency for whatever reason. The grid operator (not independently illustrated) may select certain power generation stations to go offline and stop producing power to grid 790. Advantageously, one or more flexible growcenters 200 may be used to consume power behind-the-meter, thereby allowing solar farm 700 to stop producing power to grid 790, but make productive use of the power generated behind-the-meter without transmission or distribution costs. The local station control system (not independently illustrated) of local station 775 may issue an operational directive to the one or more flexible growcenters 200 or to the remote master control system (420 of FIG. 4) to ramp-up to the desired power consumption level. When the operational directive requires the cooperative action of multiple flexible growcenters 200, the remote master control system (420 of FIG. 4) may determine how to power each individual flexible growcenter 200 in accordance with the operational directive or provide an override to each flexible growcenter 200.

Further examples of unutilized behind-the-meter power availability is when solar farm 700 experiences intermittent cloud cover such that it is not economically feasible to power up certain components, such as, for example local station 775, but there may be sufficient behind-the-meter power availability to power one or more flexible growcenters 200. Similarly, unutilized behind-the-meter power availability may occur when solar farm 700 is starting up, or testing, one or more panels 710. Panels 710 are frequently offline for installation, maintenance, and service and must be tested prior to coming online as part of the array. One or more flexible growcenters 200 may be powered by one or more panels 710 that are offline from farm 700. The above-noted examples of when unutilized behind-the-meter power is available are merely exemplary and are not intended to limit the scope of what one of ordinary skill in the art would recognize as unutilized behind-the-meter power availability. Behind-the-meter power availability may occur anytime there is power available and accessible behind-the-meter that is not subject to transmission and distribution costs and there is an economic advantage to using it.

One of ordinary skill in the art will recognize that solar farm 700 and solar panel 710 may vary based on an application or design in accordance with one or more embodiments of the present invention.

Figure 8:
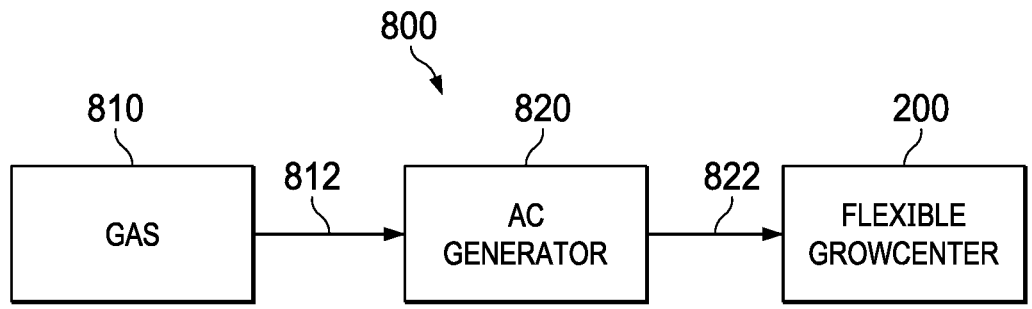
FIG. 8 shows a flexible growcenter powered by flare gas in accordance with one or more embodiments of the present invention.

FIG. 8 shows a flexible growcenter 200 powered by flare gas 800 in accordance with one or more embodiments of the present invention. Flare gas 800 is combustible gas produced as a product or by-product of petroleum refineries, chemical plants, natural gas processing plants, oil and gas drilling rigs, and oil and gas production facilities. Flare gas 800 is typically burned off through a flare stack (not shown) or vented into the air. In one or more embodiments of the present invention, flare gas 800 may be diverted 812 to a gas-powered generator that produces three-phase gas-generated AC voltage 822. This power may be considered behind-the-meter and is not subject to transmission and distribution costs. As such, one or more flexible growcenters 200 may be powered by three-phase gas-generated AC voltage. Specifically, the three-phase behind-the-meter AC voltage used to power flexible growcenter 200 may be three-phase gas-generated AC voltage 822. Accordingly, flexible growcenter 200 may reside behind-the-meter, avoid transmission and distribution costs, and may be dynamically powered when unutilized behind-the-meter power is available.

Figure 9:
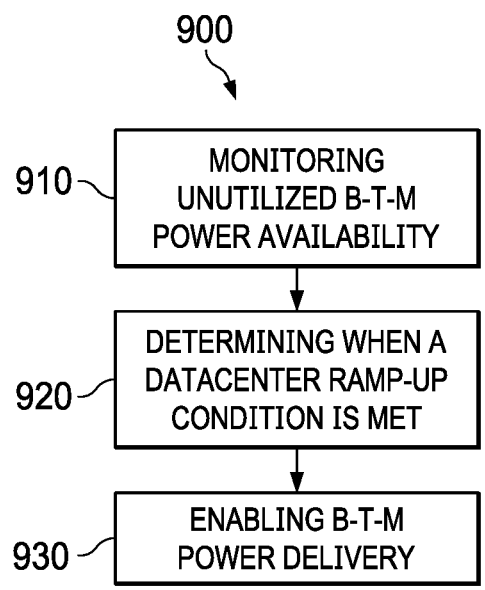
FIG. 9 shows a method of dynamic power delivery to a flexible growcenter using unutilized behind-the-meter power in accordance with one or more embodiments of the present invention.

FIG. 9 shows a method of dynamic power delivery to a flexible growcenter (200 of FIG. 2) using unutilized behind-the-meter power 900 in accordance with one or more embodiments of the present invention. In step 910, the growcenter control system (220 of FIG. 4), or the remote master control system (420 of FIG. 4), may monitor unutilized behind-the-meter power availability. In certain embodiments, monitoring may include receiving information or an operational directive from the local station control system (410 of FIG. 4) or the grid operator (440 of FIG. 4) corresponding to unutilized behind-the-meter power availability.

In step 920, the growcenter control system (220 of FIG. 4), or the remote master control system (420 of FIG. 4), may determine when a growcenter ramp-up condition is met. In certain embodiments, the growcenter ramp-up condition may be met when there is sufficient behind-the-meter power availability and there is no operational directive from the local station to go offline or reduce power. In step 930, the growcenter control system (220 of FIG. 4) may enable behind-the-meter power delivery to one or more components of the climate control system (e.g., 235, 240, and/or 245), the irrigation system (e.g., 252), and lighting system 265.

While operational, the growcenter control system (220 of FIG. 4), or the remote master control system (420 of FIG. 4), may receive an operational directive to modulate power consumption. In certain embodiments, the operational directive may be a directive to reduce power consumption. In such embodiments, the growcenter control system (220 of FIG. 4) or the remote master control system (420 of FIG. 4) may dynamically withdraw power delivery to one or more components of the climate control system (e.g., 235, 240, and/or 245), the irrigation system (e.g., 252), and lighting system 265 or subsets thereof or dynamically reduce power consumption of one or more components of the climate control system (e.g., 235, 240, and/or 245), the irrigation system (e.g., 252), and lighting system 265 or subsets thereof. In other embodiments, the operational directive may be a directive to provide a power factor correction factor. In such embodiments, the growcenter control system (220 of FIG. 4) or the remote master control system (420 of FIG. 4) may dynamically adjust power delivery to one or more components of the climate control system (e.g., 235, 240, and/or 245), the irrigation system (e.g., 252), and lighting system 265 to achieve a desired power factor correction factor. In still other embodiments, the operational directive may be a directive to go offline or power down. In such embodiments, the growcenter control system (220 of FIG. 4) may disable power delivery to one or more components of the climate control system (e.g., 235, 240, and/or 245), the irrigation system (e.g., 252), and lighting system 265.

The growcenter control system (220 of FIG. 4), or the remote master control system (420 of FIG. 4), may determine when a growcenter ramp-down condition is met. In certain embodiments, the growcenter ramp-down condition may be met if there is insufficient or anticipated to be insufficient behind-the-meter power availability or there is an operational directive from the local station to go offline or reduce power. The growcenter control system (220 of FIG. 4) may disable behind-the-meter power delivery to one or more components of the climate control system (e.g., 235, 240, and/or 245), the irrigation system (e.g., 252), and lighting system 265. Once ramped-down, the growcenter control system (220 of FIG. 4) remains powered and in communication with the remote master control system (420 of FIG. 4) so that it may dynamically power the flexible growcenter (200 of FIG. 2) when conditions change.

One of ordinary skill in the art will recognize that a growcenter control system (220 of FIG. 4) may dynamically modulate power delivery to one or more computing systems (100 of FIG. 2) of a flexible growcenter (200 of FIG. 2) based on unutilized behind-the-meter power availability or an operational directive. The flexible growcenter (200 of FIG. 2) may transition between a fully powered down state (while the growcenter control system remains powered), a fully powered up state, and various intermediate states in between. In addition, flexible growcenter (200 of FIG. 2) may have a blackout state, where all power consumption, including that of the growcenter control system (220 of FIG. 4) is halted. However, once the flexible growcenter (200 of FIG. 2) enters the blackout state, it will have to be manually rebooted to restore power to growcenter control system (220 of FIG. 4). Local station conditions or operational directives may cause flexible growcenter (200 of FIG. 2) to ramp-up, reduce power consumption, change power factor, or ramp-down.

Advantages of one or more embodiments of the present invention may include one or more of the following:

In one or more embodiments of the present invention, a method and system for dynamic power delivery to a flexible growcenter using unutilized energy sources provides a green solution to the problem of scalable container farming.

In one or more embodiments of the present invention, a method and system for dynamic power delivery to a flexible growcenter using unutilized energy sources allows for the rapid deployment of mobile growcenters to local stations. The mobile growcenters may be deployed on site, near the source of power generation, and receive unutilized behind-the-meter power when it is available.

In one or more embodiments of the present invention, a method and system for dynamic power delivery to a flexible growcenter using unutilized energy sources allows for the power delivery to the growcenter to be modulated based on conditions or an operational directive received from the local station or the grid operator.

In one or more embodiments of the present invention, a method and system for dynamic power delivery to a flexible growcenter using unutilized energy sources may dynamically adjust power consumption by ramping-up, ramping-down, or adjusting the power consumption of one or more computing systems within the flexible growcenter.

In one or more embodiments of the present invention, a method and system for dynamic power delivery to a flexible growcenter using unutilized energy sources may be powered by unutilized behind-the-meter power that is free from transmission and distribution costs. As such, the flexible growcenter may perform computational operations, such as hashing function operations, with little to no energy cost.

In one or more embodiments of the present invention, a method and system for dynamic power delivery to a flexible growcenter using unutilized energy sources provides a number of benefits to the hosting local station. The local station may use the flexible growcenter to adjust a load, provide a power factor correction, to offload power, or operate in a manner that invokes a production tax credit.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

The specification can be best understood with reference to the following Numbered Paragraphs.

Numbered Paragraph 1. A flexible growcenter comprising:
 a mobile container;
 a behind-the-meter power input system;
 a power distribution system;
 a growcenter control system;
 a climate control system,
 a lighting system; and
 an irrigation system;
 wherein the growcenter control system modulates power delivery to one or more components of the climate control system, the lighting system, and the irrigation system based on unutilized behind-the-meter power availability or an operational directive.

Numbered Paragraph 2. The flexible growcenter of Numbered Paragraph 1, further comprising:
 a remote master control system.

Numbered Paragraph 3. The flexible growcenter of Numbered Paragraph 1; wherein the behind-the-meter power input system comprises an input configured to receive three-phase behind-the-meter AC voltage and a supervisory AC-to-AC step-down transformer configured to step down the three-phase behind-the-meter AC voltage to a single-phase supervisory nominal AC voltage or an input configured to receive single-phase supervisory nominal AC voltage from a local station or metered source.

Numbered Paragraph 4. The flexible growcenter of Numbered Paragraph 3, wherein the behind-the-meter power input system provides the single-phase supervisory nominal AC voltage to the growcenter control system.

Numbered Paragraph 5. The flexible growcenter of Numbered Paragraph 1, wherein the behind-the-meter power input system comprises an input configured to receive three-phase behind-the-meter AC voltage and an operational AC-to-AC step-down transformer configured to controllably step down the three-phase behind-the-meter AC voltage to three-phase nominal AC voltage.

Numbered Paragraph 6. The flexible growcenter of Numbered Paragraph 5, wherein the growcenter control system controllably enables or disables generation of the three-phase nominal AC voltage by the operational AC-to-AC step-down transformer.

Numbered Paragraph 7. The flexible growcenter of Numbered Paragraph 1, wherein the behind-the-meter power input system provides three-phases of the three-phase nominal AC voltage to the power distribution system.

Numbered Paragraph 8. The flexible growcenter of Numbered Paragraph 7, wherein the power distribution system controllably provides a single phase of the three-phase nominal AC voltage to one or more components of the climate control system, the irrigation system, and the lighting system.

Numbered Paragraph 9. The flexible data center of Numbered Paragraph 7, wherein the growcenter control system controllably selects which phase of the three-phase nominal AC voltage the power distribution system provides to each components of the climate control system, the irrigation system, and the lighting system.

Numbered Paragraph 10. The flexible growcenter of Numbered Paragraph 7, wherein the growcenter control system modulates a power factor correction factor by controllably adjusting which phase of the three-phase nominal AC voltage each component of the climate control system, the irrigation system, and the lighting system receive.

Numbered Paragraph 11. The flexible growcenter of Numbered Paragraph 5, wherein the three-phase behind-the-meter AC voltage comprises a three-phase wind-generated AC voltage output by one or more wind turbines prior to an AC-to-AC step-up transformer that steps up the three-phase wind-generated AC voltage to a three-phase grid AC voltage.

Numbered Paragraph 12. The flexible growcenter of Numbered Paragraph 5, wherein the three-phase behind-the-meter AC voltage comprises a three-phase solar-generated AC voltage output by a DC-to-AC inverter that inputs solar-generated DC voltage from one or more solar panels and prior to an AC-to-AC step-up transformer that steps up the three-phase solar-generated AC voltage to a three-phase grid AC voltage.

Numbered Paragraph 13. The flexible growcenter of Numbered Paragraph 5, wherein the three-phase behind-the-meter AC voltage comprises a three-phase gas-generated AC voltage output by a generator that inputs combustible gas diverted from a flare or venting system.

Numbered Paragraph 14. The flexible growcenter of Numbered Paragraph 5, wherein the three-phase behind-the-meter AC voltage is a three-phase metered AC voltage.

Numbered Paragraph 15. The flexible growcenter of Numbered Paragraph 1, wherein unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation to power the flexible growcenter.

Numbered Paragraph 16. The flexible growcenter of Numbered Paragraph 1, wherein an operational directive comprises one or more of a local station directive, a remote master control directive, or a grid directive.

Numbered Paragraph 17. The flexible growcenter of Numbered Paragraph 1, wherein an operational directive comprises one or more of a dispatchability directive or a forecast directive.

Numbered Paragraph 18. The flexible growcenter of Numbered Paragraph 1, wherein an operational directive comprises a workload directive based on actual behind-the-meter power availability or projected behind-the-meter power availability.

Numbered Paragraph 19. The flexible growcenter of Numbered Paragraph 2, wherein the remote master control system dynamically adjusts power delivery to the flexible growcenter based on a remote master control directive.

Numbered Paragraph 20. The flexible growcenter of Numbered Paragraph 1, wherein the climate control system comprises a humidity control system, a gas system, and an air conditioner/heater.

Numbered Paragraph 21. The flexible growcenter of Numbered Paragraph 1, wherein the irrigation system comprises a water tank, a pump system, and a plurality of irrigation lines.

Numbered Paragraph 22. The flexible growcenter of Numbered Paragraph 1, wherein the lighting system comprises a plurality of lights.

Numbered Paragraph 23. The flexible growcenter of Numbered Paragraph 1, wherein the mobile container comprises a storage container configured for placement on a ground surface.

Numbered Paragraph 24. The flexible growcenter of Numbered Paragraph 1, wherein the mobile container comprises a storage trailer on wheels.

Numbered Paragraph 25. The flexible growcenter of Numbered Paragraph 5, further comprising a battery system configured to convert the three-phase nominal AC voltage to DC nominal voltage and store power in a plurality of storage cells.

Numbered Paragraph 26. The flexible growcenter of Numbered Paragraph 23, wherein the DC nominal voltage from the plurality of storage cells are converted via a DC-to-AC inverter to three-phase nominal AC voltage for flexible growcenter use.

Numbered Paragraph 27. A method of dynamic power delivery to a flexible growcenter using unutilized behind-the-meter power comprising:
monitoring unutilized behind-the-meter power availability;
determining when a growcenter ramp-up condition is met; and
enabling behind-the-meter power delivery to one or more components of a climate control system, a lighting system, and an irrigation system when the growcenter ramp-up condition is met.

Numbered Paragraph 28. The method of Numbered Paragraph 27, further comprising:
determining when a growcenter ramp-down condition is met; and
disabling power delivery to one or more components of the climate control system, the irrigation system; and the lighting system when the growcenter ramp-down condition is met.

Numbered Paragraph 29. The method of Numbered Paragraph 27, further comprising:
receiving an operational directive to go offline; and
disabling power delivery to the climate control system, the irrigation system, and the lighting system.

Numbered Paragraph 30. The method of Numbered Paragraph 27, further comprising:
receiving an operational directive to reduce power consumption; and
dynamically reducing power delivery to a subset of the one or more components of the climate control system; the irrigation system, and the lighting system.

Numbered Paragraph 31. The method of Numbered Paragraph 27, further comprising:
receiving an operational directive to reduce power consumption; and
dynamically reducing power consumption to one or more components of the climate control system, the irrigation system, and the lighting system.

Numbered Paragraph 32. The method of Numbered Paragraph 27, further comprising:
  receiving an operational directive to provide power factor correction; and
  dynamically adjusting power delivery to a subset of the one or more components of the climate control system, the irrigation system, and the lighting system.

Numbered Paragraph 33. The method of Numbered Paragraph 27, wherein unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations; transient local power generation situations, or testing local power generation situations where there is an economic advantage to using local behind-the-meter power generation.

Numbered Paragraph 34. The method of Numbered Paragraph 27, wherein the growcenter ramp-up condition is met if there is sufficient behind-the-meter power availability and there is no operational directive from a local station to go offline.

Numbered Paragraph 35. The method of Numbered Paragraph 27, wherein the growcenter ramp-down condition is met if there is insufficient behind-the-meter power availability or there is an operational directive from a local station to go offline.

What is claimed is:

1. A distributed computing system comprising: a flexible growcenter comprising: (i) a mobile container, (ii) a behind-the-meter power input system, (iii) a power distribution system, (iv) a growcenter control system, and (v) one or more of a climate control system, a lighting system, and an irrigation system; and a remote master control system communicatively coupled to the growcenter control system of the flexible growcenter; wherein the remote master control system is configured to specify to the growcenter control system a criteria for sufficient behind-the-meter power availability; and wherein the growcenter control system is configured to (i) determine when a growcenter ramp-up condition is met based on the criteria for sufficient behind-the-meter power availability specified by the remote master control system and (ii) enable behind-the-meter power delivery to one or more components of the climate control system, the lighting system, or the irrigation system in response to a determination that the growcenter ramp-up condition is met, the behind-the-meter power input system comprises an input configured to receive behind-the-meter power from a grid scale power generation station prior to the power undergoing step-up transformation for transmission to an electrical grid, the behind-the-meter power input system disposed on an input side of a step-up transformer; and the input of the behind-the-meter power input system is configured to receive three-phase behind-the-meter AC voltage and provide the three-phase behind-the-meter AC voltage to the power distribution system, and the input (i) further comprises a supervisory AC-to-AC step-down transformer configured to step down the three-phase behind-the-meter AC voltage to a single-phase supervisory nominal AC voltage or (ii) the input is further configured to receive the single-phase supervisory nominal AC voltage from a local station or metered source.

2. The distributed computing system of claim 1, wherein:
  the remote master control system is further configured to send an operational directive to modulate power consumption to the growcenter control system; and
  the growcenter control system is further configured to modulate power delivery to the one or more components based on the operational directive in response to receipt of the operational directive from the remote master control system.

3. The distributed computing system of claim 2, wherein the growcenter control system is further configured to:
  receive an operational directive from the remote master control system to go offline; and
  disable power delivery to the one or more of the climate control system, the lighting system, and the irrigation system in response to receipt of the operational directive.

4. The distributed computing system of claim 2, wherein the growcenter control system is further configured to:
  receive an operational directive from the remote master control system to reduce power consumption; and
  reduce power delivery to a subset of the one or more components in response to receipt of the operational directive.

5. The distributed computing system of claim 2, wherein the growcenter control system is further configured to:
  receive an operational directive from the remote master control system to reduce power consumption; and
  reduce power consumption to the one or more components in response to receipt of the operational directive.

6. The distributed computing system of claim 2, wherein the growcenter control system is further configured to:
  receive an operational directive from the remote master control system to provide power factor correction; and
  adjust power delivery to a subset of the one or more components to provide the power factor correction.

7. The distributed computing system of claim 1, wherein the growcenter control system is further configured to (i) determine when a growcenter ramp-down condition is met based on the criteria for sufficient behind-the-meter power availability specified by the remote master control system and (ii) disable power delivery to the one or more components when the growcenter ramp-down condition is met.

8. The distributed computing system of claim 1, wherein the remote master control system is further configured to monitor unutilized behind-the-meter power availability, wherein the unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation.

9. The distributed computing system of claim 1, wherein the behind-the-meter power input system comprises an input configured to receive three-phase behind-the-meter AC voltage and an operational AC-to-AC step-down transformer configured to controllably step down the three-phase behind-the-meter AC voltage to three-phase AC voltage.

10. The distributed computing system of claim 9, wherein the power distribution system controllably provides a single phase of the three-phase AC voltage to the one or more components of the climate control system, the irrigation system, or the lighting system.

11. The distributed computing system of claim 9, wherein the growcenter control system controllably selects which phase of the three-phase AC voltage the power distribution system provides to the one or more components of the climate control system, the irrigation system, or the lighting system.

12. The distributed computing system of claim 9, wherein the growcenter control system modulates a power factor correction factor by controllably adjusting which phase of the three-phase AC voltage each component of the climate control system, the irrigation system, or the lighting system receive.

13. A method for distributed control comprising: specifying, by a remote master control system, a criteria for sufficient behind-the-meter power availability to a growcenter control system communicatively coupled to the remote master control system; determining, by the growcenter control system, when a growcenter ramp-up condition is met based on the criteria for sufficient behind-the-meter power availability specified by the remote master control system; and enabling, by the growcenter control system, behind-the-meter power delivery to one or more components of a climate control system, a lighting system, or an irrigation system of a flexible growcenter in response to determining that the growcenter ramp-up condition is met, the flexible growcenter comprises: (i) a mobile container, (ii) a behind-the-meter power input system, (iii) a power distribution system, (iv) the growcenter control system, and (v) one or more of the climate control system, the lighting system, or the irrigation system; and the behind-the-meter power input system comprises an input configured to receive behind-the-meter power from a grid scale power generation station prior to the power undergoing step-up transformation for transmission to an electrical grid, the behind-the-meter power input system disposed on an input side of a step-up transformer; and the input of the behind-the-meter power input system is configured to receive three-phase behind-the-meter AC voltage and provide the three-phase behind-the-meter AC voltage to the power distribution system, and the input (i) further comprises a supervisory AC-to-AC step-down transformer configured to step down the three-phase behind-the-meter AC voltage to a single-phase supervisory nominal AC voltage or (ii) the input is further configured to receive the single-phase supervisory nominal AC voltage from a local station or metered source.

14. The method of claim 13, further comprising:
sending, by the remote master control system, an operational directive to modulate power consumption to the growcenter control system; and
modulating, by the growcenter control system, power delivery to the one or more components based on the operational directive in response to receiving the operational directive from the remote master control system.

15. The method of claim 13, further comprising:
determining, by the growcenter control system, when a growcenter ramp-down condition is met based on the criteria for sufficient behind-the-meter power availability specified by the remote master control system; and
disabling, by the growcenter control system, power delivery to the one or more components when the growcenter ramp-down condition is met.

16. The method of claim 13, further comprising monitoring, by the remote master control system, unutilized behind-the-meter power availability, wherein the unutilized behind-the-meter power availability comprises one or more of excess local power generation at a local station level, excess local power generation that a grid cannot receive, local power generation subject to economic curtailment, local power generation subject to reliability curtailment, local power generation subject to power factor correction, low local power generation, start up local power generation situations, transient local power generation situations, or testing local power generation situations where there is an economic advantage to using local behind-the-meter power generation.

17. The method of claim 13, wherein the flexible growcenter comprises a behind-the-meter power input system comprising an input configured to receive three-phase behind-the-meter AC voltage and an operational AC-to-AC step-down transformer configured to controllably step down the three-phase behind-the-meter AC voltage to three-phase AC voltage.

18. The method of claim 17, further comprising modulating, by the growcenter control system, a power factor correction factor by controllably adjusting which phase of the three-phase AC voltage each component of the climate control system, the irrigation system, or the lighting system receive.

* * * * *